(12) United States Patent
Takizawa et al.

(10) Patent No.: US 10,845,290 B2
(45) Date of Patent: Nov. 24, 2020

(54) FAILURE DETECTION DEVICE FOR PARTICULATE MATTER FILTER AND METHOD OF DETECTING FAILURE OF PARTICULATE MATTER FILTER

(71) Applicant: DENSO CORPORATION, Kariya (JP)

(72) Inventors: Kensuke Takizawa, Nisshin (JP); Kazuhiko Koike, Nisshin (JP); Go Miyagawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 166 days.

(21) Appl. No.: 16/028,610

(22) Filed: Jul. 6, 2018

(65) Prior Publication Data

US 2019/0017918 A1    Jan. 17, 2019

(30) Foreign Application Priority Data

Jul. 14, 2017   (JP) ................................. 2017-138425

(51) Int. Cl.
| | |
|---|---|
| *G01N 15/06* | (2006.01) |
| *G01N 15/08* | (2006.01) |
| *F01N 11/00* | (2006.01) |
| *F01N 3/021* | (2006.01) |
| *G01N 15/00* | (2006.01) |

(52) U.S. Cl.
CPC ......... *G01N 15/0806* (2013.01); *F01N 3/021* (2013.01); *F01N 11/00* (2013.01); *G01N 15/06* (2013.01); *G01N 15/0606* (2013.01); *G01N 15/0656* (2013.01); *F01N 2560/05* (2013.01); *F01N 2900/08* (2013.01); *G01N 2015/0046* (2013.01); *G01N 2015/084* (2013.01)

(58) Field of Classification Search
CPC ............................................... G01N 2015/084
See application file for complete search history.

(56) References Cited

U.S. PATENT DOCUMENTS

| | | | | |
|---|---|---|---|---|
| 9,399,943 | B1* | 7/2016 | Zhang | ...................... F01N 13/08 |
| 9,551,259 | B1* | 1/2017 | Zhang | ...................... F01N 9/002 |
| 9,551,262 | B1* | 1/2017 | Zhang | ...................... F01N 3/023 |
| 2005/0188681 | A1* | 9/2005 | Emi | ........................ F01N 3/023 |
| | | | | 60/277 |

(Continued)

FOREIGN PATENT DOCUMENTS

JP        2011-220974        11/2011

*Primary Examiner* — Alexander A Mercado
(74) *Attorney, Agent, or Firm* — Nixon & Vanderhye P.C.

(57) ABSTRACT

A failure detection device has a PM filter, a PM detection sensor having a sensor element arranged at a downstream of the PM filter, an ECU and a PM detection sensor control part. The sensor element detects an amount of PM in exhaust gas, and generates a sensor signal corresponding to the detected PM amount. A load detection part in the ECU detects an engine load. A judgment execution determination part in the control part compares the detected engine load with a threshold value, and determines whether a PM filter failure detection should be performed based on the comparison result. A failure judgment part compares the sensor signal with a failure judgment threshold value when the determination part decides that it is necessary to perform the failure detection of the PM filter, and determines that the PM filter failure has occurred based on the latter comparison result.

10 Claims, 14 Drawing Sheets

(56) References Cited

U.S. PATENT DOCUMENTS

| | | | | |
|---|---|---|---|---|
| 2008/0041035 A1* | 2/2008 | Sawada | ............ | F01N 3/035 |
| | | | | 60/277 |
| 2009/0301062 A1* | 12/2009 | Sumida | ............ | F01N 11/002 |
| | | | | 60/285 |
| 2011/0320171 A1* | 12/2011 | Okayama | ............ | B01D 46/0086 |
| | | | | 702/183 |
| 2012/0234172 A1† | 9/2012 | Sugiyama | | |
| 2012/0291632 A1 | 11/2012 | Nishijima | | |
| 2012/0312074 A1 | 12/2012 | Allmendinger et al. | | |
| 2012/0324841 A1† | 12/2012 | Nishijima | | |
| 2013/0036805 A1† | 2/2013 | Yoshioka | | |
| 2014/0230415 A1* | 8/2014 | Shimode | ............ | B01D 53/9477 |
| | | | | 60/286 |
| 2016/0195463 A1 | 7/2016 | Motomura et al. | | |
| 2016/0223432 A1* | 8/2016 | Kubinski | ............ | F01N 3/027 |
| 2016/0320285 A1* | 11/2016 | Weber | ............ | F02D 41/222 |
| 2016/0326936 A1* | 11/2016 | Takaoka | ............ | F01N 11/00 |
| 2016/0369673 A1* | 12/2016 | Hopka | ............ | F02D 41/1466 |
| 2017/0074143 A1* | 3/2017 | Shirasawa | ............ | F01N 3/2892 |
| 2017/0102311 A1* | 4/2017 | Zhang | ............ | F01N 3/021 |
| 2017/0159534 A1* | 6/2017 | Tsutsumi | ............ | G01M 15/102 |
| 2017/0184003 A1* | 6/2017 | Kogo | ............ | F01N 9/002 |
| 2017/0342923 A1* | 11/2017 | Zhang | ............ | G01N 15/0606 |
| 2017/0370317 A1* | 12/2017 | Fujii | ............ | F01N 3/18 |
| 2018/0283301 A1* | 10/2018 | Higa | ............ | F02D 41/22 |
| 2019/0024566 A1* | 1/2019 | Nishizawa | ............ | F01N 9/002 |
| 2019/0162092 A1* | 5/2019 | Nishizawa | ............ | F02D 41/0235 |

\* cited by examiner
† cited by third party

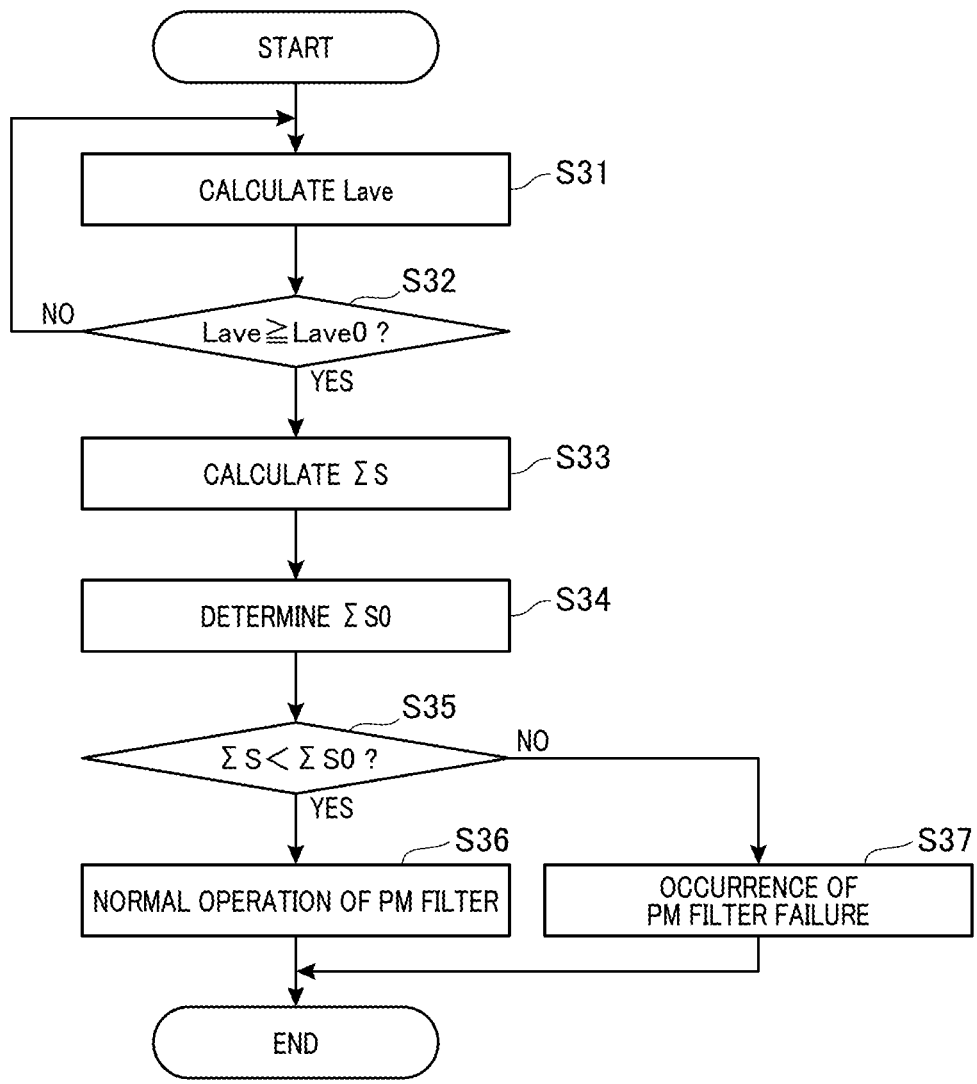

FAILURE DETECTION DEVICE FOR PARTICULATE MATTER FILTER AND METHOD OF DETECTING FAILURE OF PARTICULATE MATTER FILTER

CROSS-REFERENCE TO RELATED APPLICATION

This application is related to and claims priority from Japanese Patent Application No. 2017-138425 filed on Jul. 14, 2017, the contents of which are hereby incorporated by reference.

BACKGROUND OF THE INVENTION

1. Field of the Invention

The present invention relates to failure detection devices and methods of detecting a failure of a particulate matter filter which is capable of collecting particulate matter contained in exhaust gas emitted from an internal combustion engine.

2. Description of the Related Art

Recently, in view of environmental consciousness, pollution control standards and regulations on chemicals, particulate matter, or biological materials contained in exhaust gas emitted from an internal combustion engine for manufacturing plants, factories, various types of vehicles, etc. are becoming stricter year by year. Accordingly, there is a strong demand to provide a particulate matter filter (a PM filter) and a particulate matter detection sensor (a PM detection sensor). The PM filter is mounted on an exhaust gas passage so as to collect particulate matter contained in exhaust gas emitted from an internal combustion engine such as a diesel engine. The PM detection sensor detects whether particulate matter remains in exhaust gas so as to detect a failure of a PM filter (or, a PM filter failure). That is, the PM detection sensor is capable of detecting a very small quantity of particulate matter contained in exhaust gas as measuring gas with high accuracy.

Particulate matter is a mixture which contains conductive soot as a main component and soluble organic fraction (SOF), etc. Such SOF is derived from unburned fuel and engine oil in an internal combustion engine.

In an usual mode, a failure detection device using a PM detection sensor periodically performs a detection process so as to detect an amount of PM contained in exhaust gas at a downstream side of a particulate matter filter in an exhaust gas pipe connected to an internal combustion engine such as a diesel engine. The failure detection device compares the detected amount of particulate matter with a predetermined threshold value. For example, patent document 1, Japanese patent No. 5382210, discloses a failure detection device for a PM filter. The failure detection device has a PM elimination processing part, a failure judgment part, an average intake airflow amount calculation part, and a threshold value determination part. The PM elimination processing part performs a process of eliminating particulate matter from the PM detection sensor, where the particulate matter is collected by and accumulated on the PM detection sensor. The failure judgment part compares, with a predetermined threshold value, a sensor output value of the PM detection sensor at a timing after the elapse of a predetermined period. This predetermined period starts to count from a time when a previous PM elimination process is performed. The failure judgment part judges whether a failure of the PM filter has occurred or, whether the PM filter failure has occurred on the basis of the comparison result. The average intake airflow amount calculation part calculates an average value of an intake airflow amount during the predetermined period. The threshold value determination part determines the predetermined threshold value on the basis of the calculated average intake airflow amount calculated by the average intake airflow amount calculation part.

The failure detection device for a PM filter disclosed in patent document 1 uses the predetermined period which represents a period when an integration value of the intake airflow amount calculated by the average intake airflow amount calculation part reaches a predetermined detection execution value. This predetermined detection execution value is varied on the basis of an average value of the intake airflow amount. A detection execution value determination part reduces the predetermined detection execution value when the intake airflow amount is large.

In general, the PM detection sensor has a sensor element of an electrical resistance type (as a PM detection type) in which a pair of electrodes are arranged on a surface of an insulating substrate. When particulate matter is collected and accumulated on the surface of the insulating substrate of the sensor element, a current starts to flow between the pair of electrodes formed on the surface of the insulating substrate. A magnitude of the current corresponds to the accumulated amount of particulate matter.

A patent document 2, Japanese patent No. 5902808, discloses a sensor assembly equipped with a PM detection sensor. The PM detection sensor has a sensor part of a capacitive type (or a current detection type). That is, the PM detection sensor is a non-accumulation type sensor. When exhaust gas emitted from an internal combustion engine is flowing in a high voltage electric field in an exhaust gas pipe, particulate matter contained in the exhaust gas is charged. The PM detection sensor detects charged particulate matter contained in the exhaust gas, i.e. detects a current. A magnitude of the detected current corresponds to the amount of charged particulate matter. Because such a PM detection sensor is arranged at a downstream side of the PM filter, this makes it possible for the PM detection sensor to detect a PM detection sensor failure on the basis of the output value of the PM detection sensor.

In general, an amount of particulate matter contained in exhaust gas introduced into the PM detection sensor is changed due to variation of an intake airflow amount which varies due to the change of a driving state of the own vehicle equipped with the failure detection device. Accordingly, it is necessary for a PM detection sensor having a sensor element (or a capacitive sensor element) of the capacitive type to wait for a long period of time before it can transmit a signal corresponding to the correct amount of particulate matter contained in the exhaust gas, when the intake airflow amount, in some driving conditions of the vehicle, is low. This driving state having the small amount of the intake air reduces a detection sensitivity of the PM detection sensor.

In order to solve such a problem, the failure detection device disclosed in the patent document 1 changes the predetermined threshold value, to be used for detecting the PM filter failure on the basis of an average intake airflow amount which correlates with the flow amount of exhaust gas. Further, the failure detection device disclosed in the patent document 1 reduces an integrated intake airflow amount during a predetermined period of time until the process of detecting the PM filter failure is started because the PM collection rate increases due to the reduction of the PM flow amount when the average intake airflow amount is a small value.

However, the reduction of the intake airflow amount in the internal combustion engine of the own vehicle reduces the amount of exhaust gas emitted from the internal combustion engine and the amount of particulate matter contained in the exhaust gas introduced into the PM detection sensor is also reduced. Under this driving state of the own vehicle, it becomes difficult to correctly detect the occurrence of the PM filter failure when a shortened value is used as the predetermined period of time to reach the threshold value at which the process of detecting the PM filter failure is started.

For example, when small-sized cracks are generated in the PM filter, in other words, when a small amount of particulate matter passes through the inside of the PM filter, an amount of particulate matter detected by the PM detection sensor does not reach the predetermined threshold value within the predetermined period of time. This often prevents the PM filter failure from quickly detecting PM.

Further, the regeneration process of regenerating the PM detection sensor having the sensor element of an electrical resistance type is usually performed prior to the failure detection process of the PM filter. Because the failure detection process of detecting the PM filter failure is intermittently performed, it becomes often difficult to quickly detect failure of the PM filter.

On the other hand, the PM detection sensor having a sensor part of a capacitive type (or a current detection type) has advantages of continuously transmitting the sensor output signal thereof, and can quickly detect the occurrence of the PM filter failure. However, when the own vehicle is running under significantly variable engine load, the sensor output easily varies due to the influence of a pulsation motion of the internal combustion engine. Accordingly, the latter case generates a large fluctuation of the sensor output signal and a large detection error. This reduces the accuracy of detecting the PM filter failure.

SUMMARY

It is therefore desired to provide a failure detection device and a failure detection method of quickly detecting occurrence of a particulate matter filter failure on the basis of a sensor output of a particulate matter detection sensor with high accuracy regardless of a detection type of the particulate matter detection sensor.

In accordance with one aspect of the present invention, there is provided a failure detection device capable of detecting a failure of a particulate matter filter arranged on an exhaust gas pipe of an internal combustion engine. The failure detection device has a particulate matter detection sensor, a load detection part, a judgment execution determination part, and a failure judgment part. The particulate matter detection sensor has a particulate matter detection part such as a sensor element. The particulate matter detection part detects an amount of particulate matter contained in exhaust gas which has passed through the particulate matter filter. The particulate matter detection part generates and transmits a sensor output signal which corresponds to the detected amount of particulate matter. The load detection part detects a load of the internal combustion engine. The judgment execution determination part performs a first comparison to compare the load of the internal combustion engine detected by the load detection part with a judgment execution threshold value. The judgment execution determination part decides whether a failure detection of the particulate matter filter should be performed on the basis of the result of the first comparison. The failure judgment part performs a second comparison to compare the sensor output signal of the particulate matter detection sensor with a failure judgment threshold value when the judgment execution determination part decides to perform the failure detection of the particulate matter filter. Further, the failure judgment part detects occurrence of a particulate matter filter failure on the basis of the second comparison result.

In accordance with another aspect of the present invention, there is provided a failure detection method for detecting a failure of a particulate matter filter arranged on an exhaust gas pipe of an internal combustion engine. In the method, a particulate matter detection sensor is arranged at a downstream side of the particulate matter filter. The particulate matter detection sensor has a particulate matter detection part which is capable of detecting an amount of particulate matter contained in exhaust gas which has passed through the particulate matter filter. The method has a step of generating and transmitting a sensor output signal which corresponds to the detected amount of particulate matter. The method has a step for detecting a load of the internal combustion engine, a step of performing a first comparison to compare the load of the internal combustion engine with a judgment execution threshold value. The method further has a step of determining whether a failure detection of the particulate matter filter should be performed on the basis of the result of the first comparison, a step of performing a second comparison to compare the sensor output signal of the particulate matter detection sensor with a failure judgment threshold value when the execution of the failure detection of the particulate matter filter has been decided. The method further has a step of detecting occurrence of a particulate matter filter failure on the basis of the second comparison result.

In the failure detection device according to the present invention having the structure previously described, the judgment execution determination part performs the first comparison for comparing the load of the internal combustion engine detected by the load detection part with the judgment execution threshold value. The judgment execution determination part decides to perform the failure detection of the particulate matter filter when the result of the first comparison indicates that the load of the internal combustion engine detected by the load detection part is not less than the judgment execution threshold value.

The failure judgment part performs a second comparison for comparing the sensor output signal of the particulate matter detection sensor with the failure judgment threshold value when the judgment execution determination part decides to perform the failure detection of the particulate matter filter. For example, the failure judgment threshold value corresponds to an amount of particulate matter contained in exhaust gas which has passed through a failed particulate matter filter as a reference filter. The failure judgment part detects occurrence of the particulate matter filter failure on the basis of the second comparison result, i.e. when the sensor output signal of the particulate matter detection sensor is not less than the failure judgment threshold value.

As previously described, the failure detection device according to the present invention has the judgment execution determination part for determining whether the failure detection of the particulate matter filter has to be performed on the basis of the load of the internal combustion engine. For example, the failure judgment part detects the particulate matter filter failure only when the amount of particulate matter contained in exhaust gas emitted from the engine becomes an sufficiently large amount so as to sufficiently and correctly perform the failure detection based on the sensor output value of the particulate matter detection part with high accuracy.

Further, the failure detection method uses the failure detection device having the structure previously described, and sequentially performs the judgment execution determination step and the failure detection step. This makes it possible to perform the failure detection of the particulate matter filter at a correct timing with high accuracy, and reduces a detection error and reduces the variation of the sensor output values transmitted from the particulate matter detection sensor As previously described, the present invention provides a failure detection device and failure detection method capable of quickly detecting occurrence of the particulate matter filter failure with high accuracy on the basis of the sensor output signals of the particulate matter detection sensor regardless of the type of the particulate matter detection sensor.

BRIEF DESCRIPTION OF THE DRAWINGS

A preferred, non-limiting embodiment of the present invention will be described by way of example with reference to the accompanying drawings, in which:

FIG. 16 is a view showing a flow chart of the failure detection process of the particulate matter filter performed by the failure detection device according to a third exemplary embodiment of the present invention;

DETAILED DESCRIPTION OF THE PREFERRED EMBODIMENTS

Figure 1:
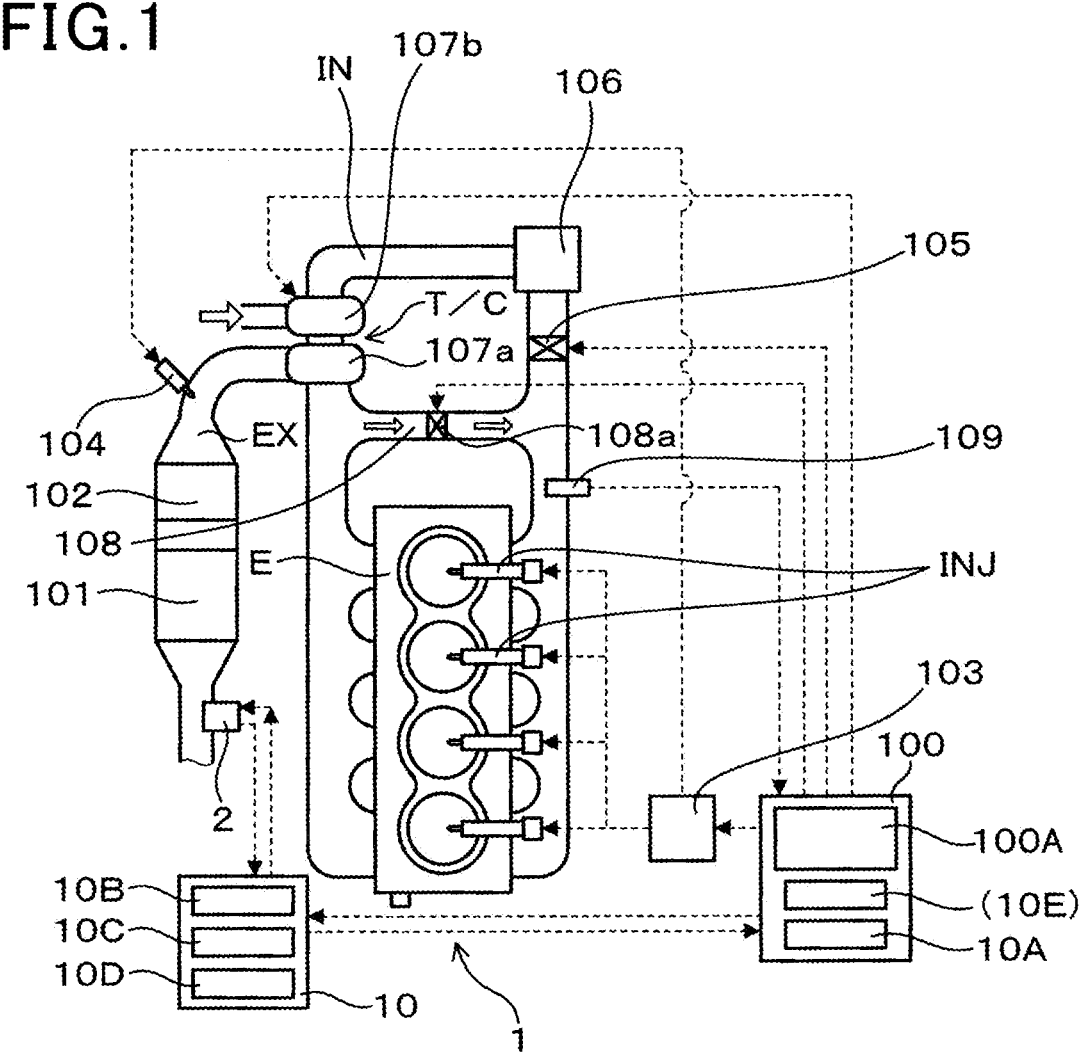
FIG. 1 is a view showing a schematic structure of an internal combustion engine equipped with a failure detection device for a particulate matter filter according to a first exemplary embodiment of the present invention.

Hereinafter, various embodiments of the present invention will be described with reference to the accompanying drawings. In the following description of the various embodiments, like reference characters or numerals designate like or equivalent component parts throughout the several diagrams.

First Exemplary Embodiment

A description will be given of a failure detection device for a particulate matter filter (hereinafter, the PM filter) according to the first exemplary embodiment with reference to FIG. 1 to FIG. 9.

FIG. 1 is a view showing a schematic structure of an internal combustion engine E (hereinafter, the engine E) equipped with the failure detection device 1 for the PM filter 101 according to the first exemplary embodiment. As shown in FIG. 1, the engine E is a four cylinder direct injection diesel engine having a turbocharger T/C mounted on a vehicle, for example. The PM filter 101 is mounted in an exhaust gas pipe EX as an exhaust gas passage connected to the engine E, through which exhaust gas emitted from the engine E is discharged to the outside of the engine E.

The failure detection device 1 is mounted on the exhaust gas pipe EX to detect occurrence of failure of the PM filter 101. An oxygen catalyst part 102 is arranged at the upstream side of the PM filter 101 in the exhaust gas pipe EX. The structure of the oxygen catalyst part 102 will be explained later.

Further, a particulate matter detection sensor 2 (hereinafter, the PM detection sensor 2) is arranged at the downstream side of the PM filter 101 in the exhaust gas pipe EX. The PM detection sensor 2 detects particulate matter contained in exhaust gas which has passed through the PM filter 101, and generates a detection signal which represents the detected amount of particulate matter, and transmits the detection signal to a particulate matter detection sensor control part 10 (hereinafter, the PM detection sensor control part 10).

Figure 2:
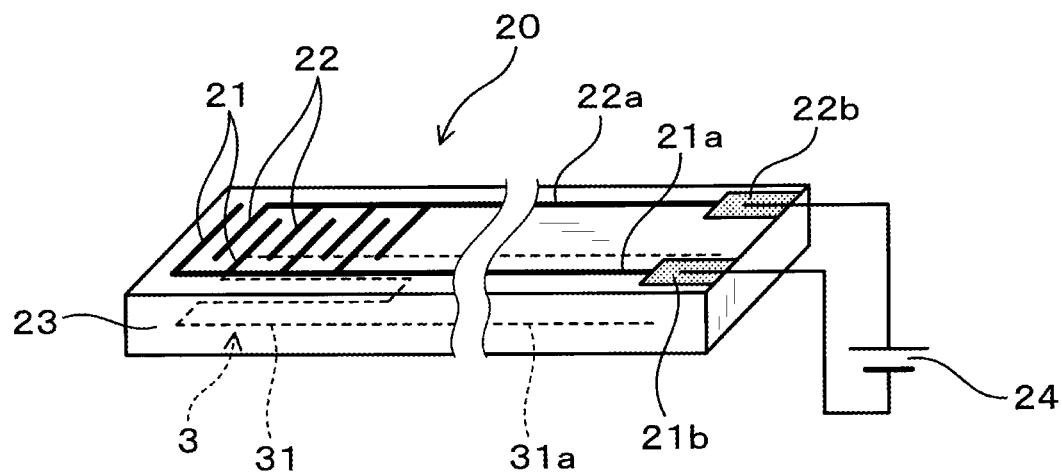
FIG. 2 is a perspective view showing a schematic structure of a sensor element as a PM detection part in the PM detection sensor according to the first exemplary embodiment of the present invention.

FIG. 2 is a perspective view showing a schematic structure of a sensor element 20 of an electrical resistance type as a PM detection part in the PM detection sensor 2 according to the first exemplary embodiment. The sensor element 20 is a particulate matter detection part (hereinafter, the PM detection part.) Further, a heater part 3 and the sensor element 20 are assembled together. When receiving electric power, the heater part 3 generates heat energy to burn particulate matter accumulated on the sensor element 20.

The sensor element 20 has an insulating substrate 23 having an elongated rectangular plate shape and a pair of electrodes 21, 22. Each of the pair of electrodes 21 and 22 is formed on a first surface, for example, on a left hand side of the first surface, of the insulating substrate 23. A heater electrode 31 is embedded in the sensor element 2 which corresponds in location to the pair of electrodes 21 and 22. The heater electrode 31 forms the heater part 3. A pair of lead wires 21a, 21b, which extend from the pair of electrodes 21, 22 to a longitudinal direction of the sensor element 20, are connected to an external voltage supply part 24 through a pair of terminal parts 21b, 22b arranged on the other end part of the sensor element 2 so as to supply electric power to the pair of electrodes 21, 22.

Similar to the structure of the pair of electrodes 21, 22, the heater electrode 31 is connected to an on-vehicle power source (not shown) through a pair of lead wires 31a, 31b extended to the other end part of the sensor element 2. For example, the insulating substrate 23 is made of insulating ceramic such as alumina. The pair of electrodes 21, 22 and the heater part 32 are made of noble metal such as platinum (Pt).

Figure 3:
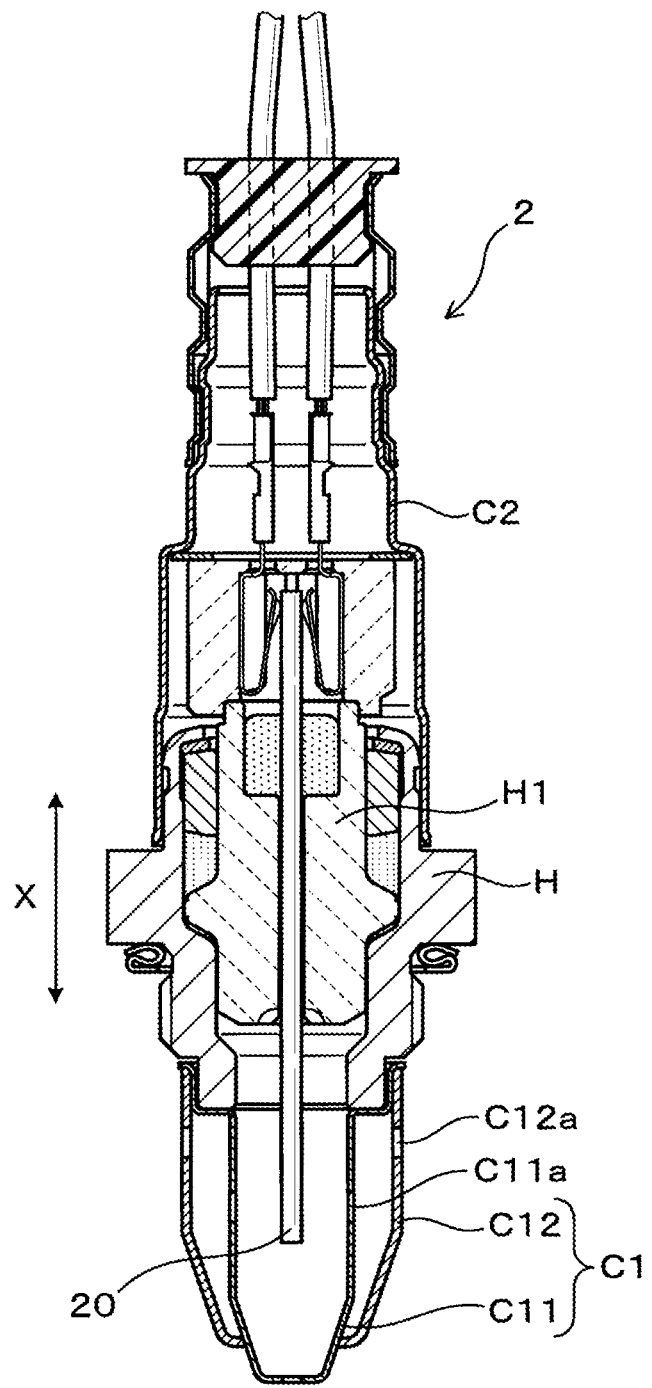
FIG. 3 is a view showing a cross section of an overall structure of the PM detection sensor mounted on the failure detection device according to the first exemplary embodiment of the present invention.

FIG. 3 is a view showing a cross section of an overall structure of the PM detection sensor 2 mounted on the failure detection device 1 according to the first exemplary embodiment.

As shown in FIG. 3, the PM detection sensor 2 has a housing H, an exhaust gas side cover C1 and an atmosphere side cover C2. The housing H accommodates the sensor element 20. The exhaust gas side cover C1 is arranged at the front end side of the housing H. The atmosphere side cover C2 is arranged at the distal end side of the housing H. A longitudinal direction of the sensor element 20 corresponds to an axial direction X of the PM detection sensor 2. A first end part as one end part of the sensor element 20, at which the pair of electrodes 21, 22 are arranged, is arranged in the inside chamber of the exhaust gas side cover C1. The sensor element 20 is supported by and fixed to the inner periphery of the housing H through a cylindrical shaped insulator H1. The PM detection sensor 2 is fixed to and mounted in a wall part of the exhaust gas pipe EX (see FIG. 1) by using a screw mounted on the outer periphery of the housing H.

The first end part of the sensor element 20 is accommodated in the exhaust gas side cover C1 and arranged to project to the inside of the exhaust gas pipe EX and to expose the exhaust gas which has been introduced into the inside of the PM detection sensor 2. For example, the exhaust gas side cover C1 has a double container structure composed of an inner cover C11 and an outer cover C12 shown in FIG. 3.

The inner cover C11 has through holes C11a and the outer cover C12 has through holes C12a. Exhaust gas (not shown) is introduced into the inside of the PM detection sensor 2 and discharged from the PM detection sensor 2 through the through holes C11a and C12a.

A description will be given of the detection principal of calculating an amount of particulate matter contained in exhaust gas by using the PM detection sensor 2 with reference to FIG. 4.

Figure 4:
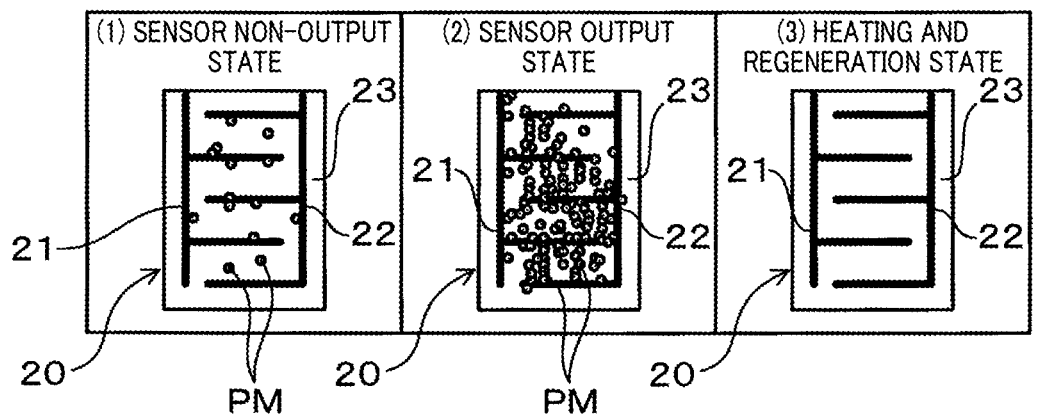
FIG. 4 is a view explaining action of the sensor element in the PM detection sensor mounted on the failure detection device according to the first exemplary embodiment of the present invention.

FIG. 4 is a view explaining action of the sensor element 20 in the PM detection sensor 2 mounted on the failure detection device 1 according to the first exemplary embodiment of the present invention.

In the structure of the sensor element 20 of an electrical resistance type. The pair of electrodes 21, 22 are formed on a first surface of the insulating substrate 23 of the sensor element 20 of an electrical resistance type so that the pair of electrodes 21, 22 face with each other to keep a predetermined interval. During the PM detection period, the external voltage supply part 24 supplies a predetermined detection voltage to the pair of electrodes 21, 22 so as to generate electric field between the pair of electrodes 21, 22. Particulate matter contained in exhaust gas around the sensor element 20 is attracted by the electric field and electrostatically accumulated on the first surface of the insulating substrate 23 around the pair of electrodes 21, 22.

In a sensor non-output state designated by reference character (1) shown at the left-hand side in FIG. 4, because no electric power is supplied to the pair of electrodes 21, 22, the PM detection sensor 2 generates and transmits no detection signal. In the sensor non-output state designated by reference character (1), the sensor output of the PM detection sensor 2 becomes zero.

After the sensor non-output state, particulate matter is gradually accumulated on the first surface of the insulating substrate 23 in a sensor output state designated by reference character (2) shown at the central part in FIG. 4. During the sensor output state, the pair of electrodes 21, 22 are electrically connected through the accumulated particulate matter. That is, a conductive path is formed on the first surface of the insulating substrate 23 through the accumulated particulate matter.

An ammeter (not shown) detects a magnitude of a current flowing in the pair of electrodes 21, 22 during the sensor output state designated by reference character (2) shown in FIG. 4. The PM detection sensor 2 outputs the detection signal which corresponds to the detected magnitude of the current. That is, the detected magnitude of the current corresponds to the amount of particulate matter (i.e. the PM accumulation amount) accumulated on the first surface of the insulating substrate 23 of the sensor element 20.

Figure 5:
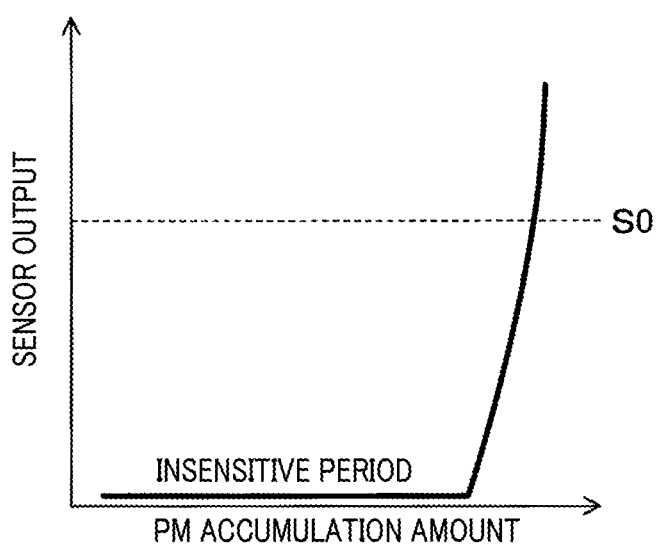
FIG. 5 is a graph showing sensor output characteristics of the sensor element in the PM detection sensor mounted on the failure detection device according to the first exemplary embodiment of the present invention.

FIG. 5 is a graph showing the sensor output characteristics of the sensor element 20 in the PM detection sensor 2 mounted on the failure detection device 1 according to the first exemplary embodiment of the present invention.

As shown in FIG. 5, the PM detection sensor 2 having the sensor element 20 of an electrical resistance type has the output characteristics which has an insensitive period in which the PM detection sensor 2 generates and transmits no detection signal, i.e. the detection signal of zero until the conductive path is formed between the pair of electrodes 21, 22. After the insensitive period, when the PM detection sensor 2 transmits the detection signal of not less than zero, a resistance between the pair of electrodes 21, 22 is reduced and the magnitude of the detection signal increases according to the increase of the PM accumulation amount on the first surface of the insulating substrate 23 of the sensor element 20.

A failure judgment threshold value S0 has been determined in advance, which is not less than the PM accumulation amount which corresponds to the insensitive period of the PM detection sensor 2. It is possible for the failure detection device 1 according to the first exemplary embodiment to correctly perform the failure judgment process of detecting whether the failure has occurred in the PM filter 101 on the basis of the detected PM accumulation amount.

It is also acceptable to use the failure judgment threshold value S0 on the basis of the length of the insensitive period.

After the sensor output state designated by reference character (2) shown in FIG. 4, the failure detection device 1 or another control device instructs the external voltage supply part 24 to supply electric power to the heater part 3 and the sensor element 20 so as to generate heat energy and burn particulate matter accumulated on the first surface of the insulating substrate 23 of the sensor element 20. This process is the sensor regeneration process (see a heating and regeneration state designated by reference character (3) at the right-hand side in FIG. 4) which is periodically performed so as to remove the accumulated particulate matter from the PM detection sensor 2. This makes it possible to use the PM detection sensor 2 for a long period of time and to increase the durability of the PM detection sensor 2.

In the structure of the failure detection device 1 according to the first exemplary embodiment shown in FIG. 1, the PM detection sensor 2 directly transmits the detection signal to the PM detection sensor control part 10 connected to an engine control device (hereinafter, the ECU 100).

The failure detection device 1 according to the first exemplary embodiment shown in FIG. 1 has the ECU 100 and the PM detection sensor control part 10. The ECU 100 has a load detection part 10A. The PM detection sensor control part 10 has a judgment execution determination part 10B and a failure judgment part 10C.

The load detection part 10A in the ECU 100 detects a load L of the engine E.

The judgment execution determination part 10B compares the load L detected by the load detection part 10A with a judgment execution threshold value L0. When the comparison result of the judgment execution determination part 10B indicates that the load L is not less than the judgment execution threshold value L0, the judgment execution determination part 10B performs the failure detection process of the PM filter 101.

When the judgment execution determination part 10B decides that the failure detection process of the PM filter 101 should be performed, the failure judgment part 10C compares the sensor output value S of the sensor element 20 with the failure judgment threshold value S0 so as to detect occurrence of failure of the PM filter 101.

Specifically, the judgment execution determination part 10B decides that the failure detection process of the PM filter 101 should be performed when the load L is not less than the judgment execution threshold value L0.

The PM detection sensor control part 10 has a heating control part 10D which instructs the external voltage supply part 24 or another voltage power supply part to supply electric power to the heater part 3 (see FIG. 2) to generate heat energy. This process increases a temperature of the insulating substrate 23 to burn the particulate matter accumulated on the first surface of the insulating substrate 23. When the temperature of the insulating substrate 23 reaches the regeneration temperature T, the accumulated particulate matter is eliminated from the first surface of the insulating substrate 23, and the sensor element 20 in the PM detection sensor 2 is regenerated.

The failure detection process executed by the failure detection device 1 will be explained later in detail.

Fuel injection valves INJ are arranged in the engine E, which correspond to cylinders of the engine E, respectively. The ECU 100 transmits instruction signals to a drive device 103 which instructs each of the fuel injection valves INJ to directly inject fuel into a combustion chamber of the corresponding cylinder. The engine E emits exhaust gas into the exhaust gas pipe EX. The exhaust gas flows to the PM detection sensor 2 mounted on the exhaust gas pipe EX. The exhaust gas is purified through the oxygen catalyst part 102 and the PM filter 101. For example, the PM filter 101 has a known filter structure of a wall-flow type. The PM filter 101 collects particulate matter contained in exhaust gas. Specifically, the PM filter 101 has a honeycomb structural body made of porous ceramics. The honeycomb structural body has a plurality of cells formed along the longitudinal direction of the honeycomb structural body, through which exhaust gas passes. One end part of each cell is plugged by a plug member, and the other end part thereof is open. On a first end surface of the PM filter 101, the cells having the plug member and the cells having an opening part are alternately arranged in a checkered pattern arrangement. The exhaust gas is introduced into the inside of the PM filter 101 through the opening parts of the cells. Then, the exhaust gas passes through partition wall between the adjacent cells and is discharged to the opening part of the adjacent cell to the outside of the PM filter 101.

The oxygen catalyst part 102 is composed of a supporter body. The supporter body is composed of a honeycomb structural body made of porous ceramics such as cordierite and oxygen catalyst. The oxygen catalyst is supported on a surface of the honeycomb structural body.

A fuel addition valve 104 is arranged at the upstream side of the oxygen catalyst part 102 so as to add fuel into exhaust gas which is flowing in the exhaust gas pipe EX. For example, during the regeneration process of the PM filter 101, the fuel addition valve 104 supplies fuel into the exhaust gas flowing in the exhaust gas pipe EX so as to burn the added fuel and increase a temperature of exhaust gas. This makes it possible to burn and regenerate the PM detection sensor 2 so as to repeatedly use the PM detection sensor 2 for a long period of time.

An air flow meter 106 is arranged at the upstream side of a throttle valve 105 in an intake air pipe IN so as to detect an amount of the intake air. The throttle valve 105 adjusts the amount of intake air according to an opening ratio of an accelerator. A turbocharger has a turbine 107a and a compressor 107*b*. The turbine 107*a* is mounted on the exhaust gas pipe EX. The compressor 107*b* is mounted on the intake air pipe IN. The turbocharger 107 composed of the turbine 107*a* and the compressor 107*b* compresses the intake air at a predetermined boost pressure, and supplies the compressed intake air into the exhaust gas. The exhaust gas pipe EX is connected to the intake air pipe IN through an exhaust gas recirculation passage 108 (hereinafter, the EGR passage 108). The EGR passage 108 is equipped with an exhaust gas recirculation valve 108*a* (hereinafter, the EGR valve 108*a*).

A mixture gas of the exhaust gas and the intake air is circulated into the intake air pipe IN. The flow amount of the mixture gas of the exhaust gas and the intake air is determined based on an opening ratio of the EGR valve 108*a*.

The ECU 100 receives, through an input/output interface 100A, detection signals transmitted from various types of sensors such as an air flow meter 106, an intake air pressure sensor 109, an accelerator opening ratio sensor (not shown), a rotation speed sensor (not shown) of the engine E.

The ECU 100 detects the operation state of the engine E based on the received detection signals transmitted from the various types of the sensors previously described. In order to perform the optimum operation state of the engine E, the ECU 100 adjusts the operation of the various components of the engine E on the basis of the detected operation state of the engine E, operation programs and operation maps which have been stored in a memory unit (not shown).

The drive device 103 receives instruction signals transmitted from the ECU 100, and drives the fuel injection valves INJ, the fuel addition valve 104, the throttle valve 105, the turbine 107*a*, and the EGR valve 108*a* at each predetermined timing on the basis of the received instruction signals.

The control operation previously described makes it possible to correctly drive the turbocharger pressure of the turbocharger and to correctly adjust the amount of the mixture gas in the exhaust gas recirculation. This control makes it possible to reduce the amount of particulate matter and nitrogen oxide (NOx), etc. contained in exhaust gas. Further, this control makes it possible to prevent particulate matter from being discharged to the outside of the engine E because the PM filter 101 mounted in the exhaust gas pipe EX collects and capture particulate matter contained in exhaust gas.

When a particulate matter filter failure (hereinafter, the PM filter failure) has occurred, the function of the PM filter 101 for collecting and capturing particulate matter is reduced, and the exhaust gas containing particulate matter is discharged to the outside of the engine E.

There are various states of the PM filter failure. For example, when cracks such as fine cracks are generated in the porous honeycomb structural body forming the PM filter 101, the function of the PM filter 101 deteriorates, and a collection rate of particulate matter is reduced, and another abnormality has occurred in the PM filter 101.

The failure detection device 1 according to the first exemplary embodiment detects occurrence of failure of the PM filter 101, and quickly provides the information and warning the detected PM filter failure to the driver of the own vehicle equipped with the engine E having the failure detection device 1. In order to quickly inform the warning to the driver of the own vehicle, the PM detection sensor 2 in the failure detection device 1 located at the downstream side of the PM filter 101 detects whether particulate matter is contained in exhaust gas, and the sensor control part 10 performs the failure judgment step on the detection result of the PM detection sensor 2.

Specifically, in the failure detection device 1 according to the first exemplary embodiment, the load detection part 10A in the ECU 100, the judgment execution determination part 10B and the failure judgment part 10C in the PM detection sensor control part 10 sequentially perform in order the load detection step, the judgment execution determination step, the failure judgment step so as to detect the occurrence of failure of the PM filter 101.

That is, the load detection part 10A performs the load detection step of detecting a load L of the engine E on the basis of the detection signals detected by and transmitted to the ECU 100 from the various types of the sensors.

Next, the judgment execution determination part 10B performs the judgment execution determination step of comparing the load L detected by the load detection step with the judgment execution threshold value L0. Specifically, when the detected load L is not less than the judgment execution threshold value L0, the judgment execution determination part 10B decides to perform the failure judgment step of the PM filter 101.

The failure judgment part 10C in the ECU 100 starts to perform the failure judgment step when the judgment execution determination part 10B has decided that the failure judgment step of the PM filter 101 should be performed. Specifically, the sensor output value S of the sensor element 20 in the PM detection sensor 2 is compared with the failure judgment threshold value S0. The failure judgment part 10C in the ECU 100 decides whether the failure has occurred in the PM filter 101 on the basis of the comparison result.

After this, when the failure detection process is performed again, the heating control part 10D instructs the external voltage supply part 24 or another voltage power supply part to supply electric power to the heater part 3 so as to generate heat energy, prior to the execution of the failure judgment process. The sensor element 20 is heated by the generated heat energy so as to perform the regeneration step of the PM detection sensor 2.

In the regeneration step, the sensor element 20 is heated by the generated heat energy at a regeneration temperature so as to burn particulate matter and to remove the particulate matter from the sensor element 20.

A description will be given of the explanation of the load detection step, the judgment execution determination step, the failure judgment step with reference to FIG. 6.

Figure 6:
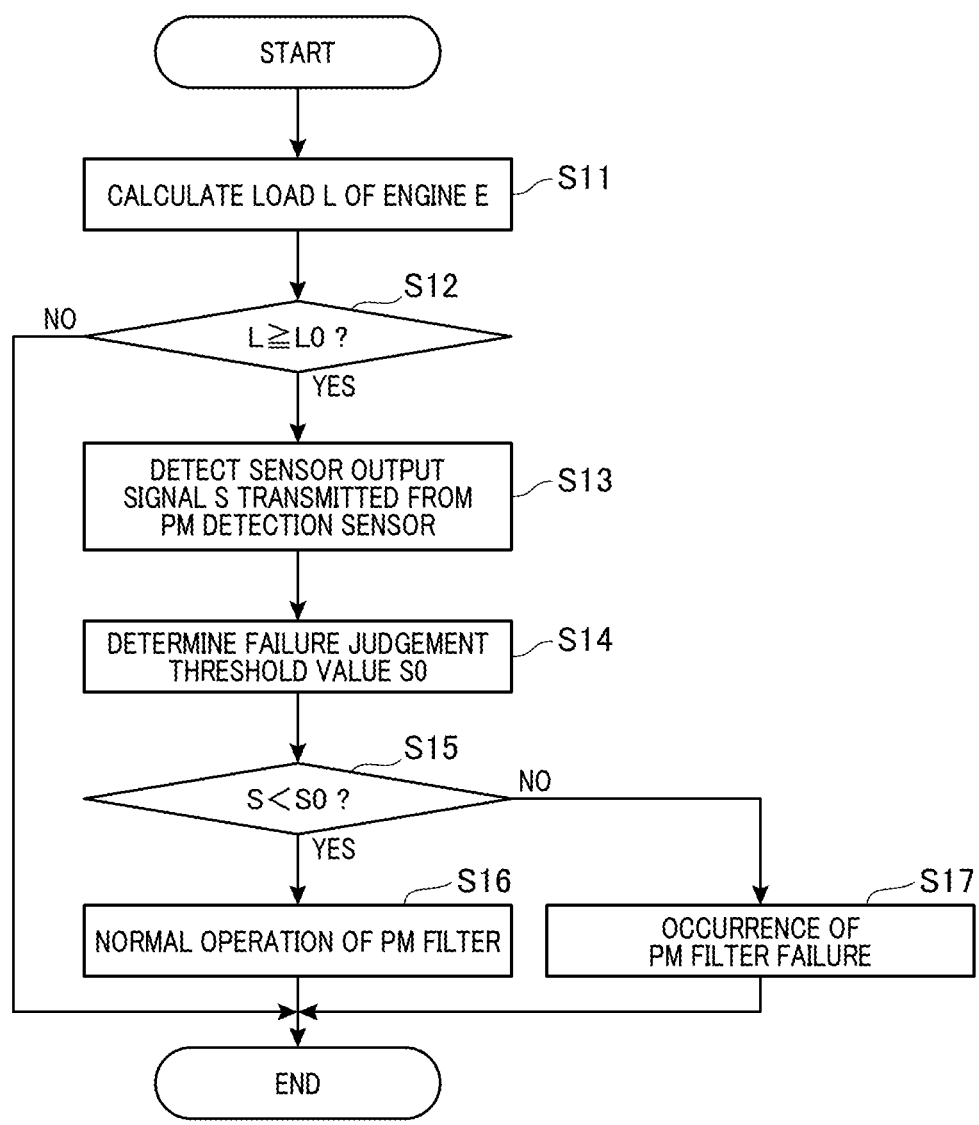
FIG. 6 is a view showing a flow chart of the failure detection process of the particulate matter filter performed by the failure detection device according to the first exemplary embodiment of the present invention.

FIG. 6 is a flow chart showing one example of the failure detection process of the PM filter 101 periodically performed by the failure detection device 1 according to the first exemplary embodiment of the present invention. In FIG. 6, step S11 corresponds to the load detection step. Step S12 corresponds to the judgment execution determination step. A set of steps S15 to step S17 corresponds to the failure judgment step.

When the failure detection process is initiated, the load detection part 10A in the ECU 100 detects a load L of the engine E. That is, it is possible for the load detection part 10A to detect the load L of the engine E by using the operation maps on the basis of the received detection results (or operation parameters) which are transmitted from the various types of sensors, such as the rotation speed of the engine E, the intake airflow amount, the EGR (exhaust gas recirculation) rate, the temperature of a coolant such as cooling water, etc. As previously described, the operation maps have been stored in a memory unit (not shown).

It is acceptable for the arithmetic part in the ECU 100 to calculate the load L of the engine E on the basis of those operation parameters as the received detection results of the various types of sensors.

The operation flow progresses to step S12. In step S12, the judgment execution determination part 10B in the PM detection sensor control part 10 judges whether the load L of the engine E is not less than the judgment execution threshold value L0 (whether L≥L0).

Figure 7:
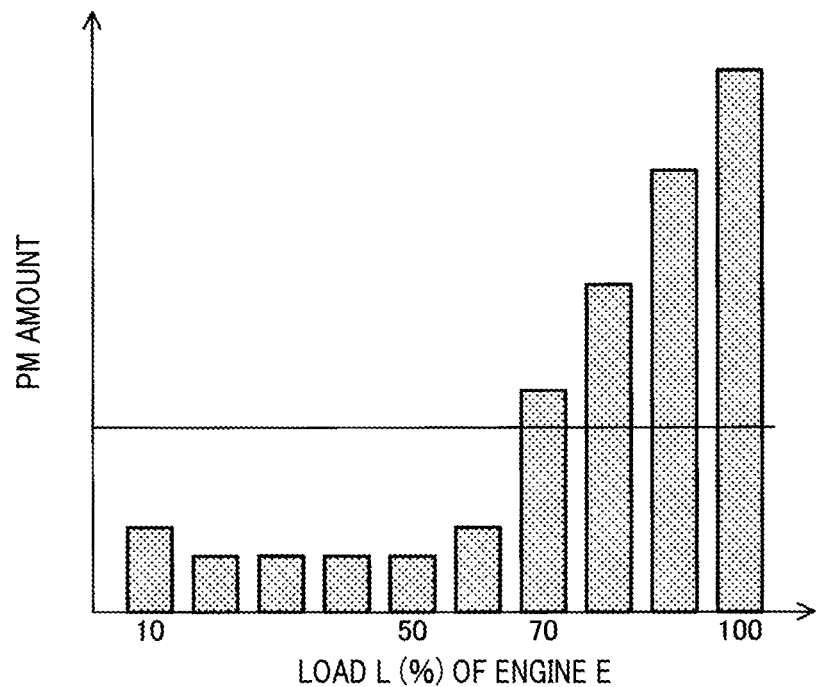
FIG. 7 is a graph showing a relationship between a load of the engine and an amount of particulate matter (PM amount) contained in exhaust gas emitted from an internal combustion engine, which is used by the failure detection device according to the first exemplary embodiment of the present invention.

FIG. 7 is a graph showing a relationship between the load L of the engine E and the amount of particulate matter (hereinafter, the PM amount) contained in exhaust gas emitted from the engine E, which is used by the failure detection device 1 according to the first exemplary embodiment. In general, there is a correlation between the load L of the engine E and the amount of exhaust gas emitted from the engine E.

For example, as shown in FIG. 7, under the condition in which the engine E rotates at the rotation speed of 2000 rpm, increasing of the load L (%) within a range of 10% to 100% causes the increasing of the PM amount. In particular, the load L of the engine E exceeds 60%, the PM amount significantly increases.

Figure 8:
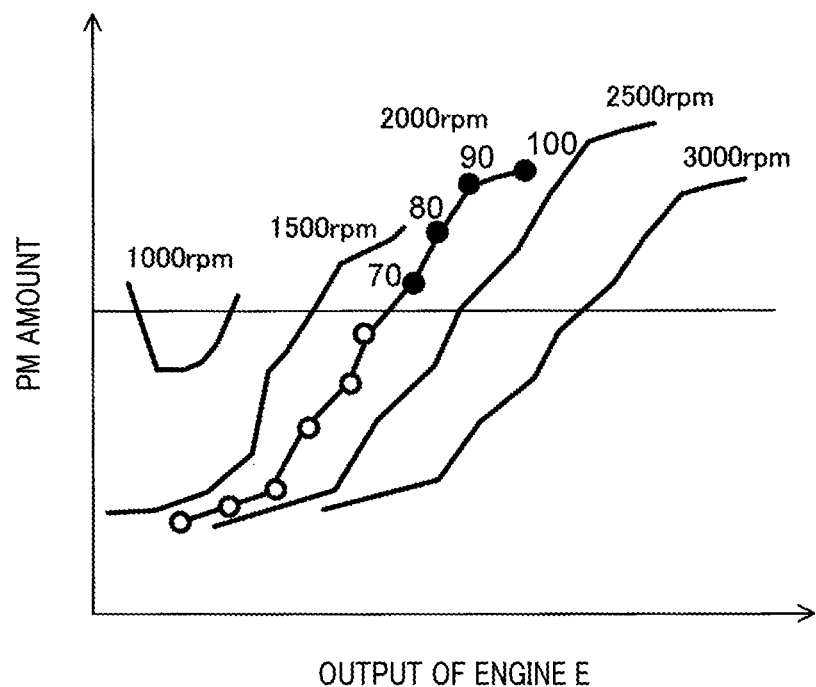
FIG. 8 is a view showing a relationship between the engine output or torque and the amount of particulate matter (i.e. the PM amount) contained in exhaust gas at various rotation speeds of the internal combustion engine, which is used by the failure detection device according to the first exemplary embodiment of the present invention.

FIG. 8 is a view showing a relationship between the engine output (torque) and the amount of particulate matter (the PM amount) contained in exhaust gas at various rotation speeds of the engine E, which is used by the failure detection device 1 according to the first exemplary embodiment.

As shown in FIG. 8, the engine output, i.e. the torque of the engine E to maintain the constant rotation speed (for example, 2000 rpm) varies due to the load L of the engine E. Further, the larger the load L of the engine E increases, the greater the PM amount in the exhaust gas emitted from the engine E is. This trend is maintained even if the rotation speed of the engine E increases. When the load L of the engine E is not less than the ratio of 70%, the PM amount significantly increases.

In the first exemplary embodiment, the judgment execution threshold value L0 is 70%. When the load L of the engine E detected in step S11 is not less than 70% of the load L as the judgment execution threshold value L0, the judgment result in step S12 indicates positive ("YES" in step S12), i.e. the judgment execution determination part 10B judges that the load L of the engine E is not less than 70% of the load L as the judgment execution threshold value L0 (L≥L0).

It is acceptable to increase the load L of the engine E as the judgment execution threshold value L0 when the rotation speed of the engine E is low, as compared with the load L when the rotation speed of the engine E is high.

Further, it is acceptable for the judgment execution determination part 10B to judge that the comparison result in step S12 indicates positive ("YES" in step S12) when the engine E is operating at the rotation speed of not less than 1500 rpm in which the PM amount significantly increases.

For example, it is possible for the judgment execution determination part 10B to use a map of the judgment execution threshold value L0 which has been stored in a memory part (not shown) in the ECU 100. It is also acceptable for the arithmetic part in the ECU 100 to calculate the judgment execution threshold value L0 by using the operation parameters such as the rotation speed of the engine E, the intake airflow amount, the EGR (exhaust gas recirculation) rate, the temperature of cooling water, etc.

When the comparison result is positive ("YES" in step S12), i.e. indicates that the load L of the engine E detected in step S11 is not less than the judgment execution threshold value L0, the judgment execution determination part 10B judges that the engine E is operating during a high load state and the failure detection process should be performed. The operation flow progresses to step S13 shown in FIG. 6.

On the other hand, when the comparison result indicates negative ("NO" in step S12), i.e. when the load L of the engine E detected in step S11 is not than the judgment execution threshold value L0, i.e. when L<L0, the PM detection sensor control part 10 finishes the failure detection process shown in FIG. 6. In this case, the PM detection sensor control part 10 erases the detection signals and the calculation results.

In step S13 when the comparison result in step S12 indicates L≥L0, the PM detection sensor control part 10 receives the sensor output value S of the sensor element 20 in the PM detection sensor 2. The operation flow progresses to step S14 shown in FIG. 6.

In step S14, the PM detection sensor control part 10 determines the failure judgment threshold value S0.

The failure judgment threshold value S0 is a predetermined sensor output value with which the PM detection sensor control part 10 correctly determines the occurrence of failure of the PM filter 101 because the PM detection sensor 2 generates and transmits an abnormality output value which exceeds the normal output value of the PM detection sensor 2.

For example, under the operation state of the engine E in which the load L is not less than 70% and exhaust gas contains a large amount of particulate matter, shown in FIG. 7 and FIG. 8, the PM detection sensor control part 10 determines in advance the judgment execution threshold value L0 when the PM filter failure has occurred, for example, when cracks are generated in the PM filter 101.

Because the PM amount which reaches the PM detection sensor 2 varies due to the variation of a flow amount of exhaust gas, it is acceptable to adjust the failure judgment threshold value S0 on the basis of the intake airflow amount when the exhaust gas system intake a large amount of intake air.

For example, it is possible to store a map value in the memory unit in the PM detection sensor control part 10 or the memory unit in the ECU 100. Each map value corresponds to an intake airflow amount every time when the air flow meter 106 detects.

It is acceptable for the arithmetic part in the ECU 100 to calculate the intake airflow amount as the operation parameter, and to transmit the calculated value as the failure judgment threshold value S0 to the PM detection sensor control part 10. The operation flow progresses to step S15.

In step S15, the failure judgment part 10C compares the sensor output value S of the sensor element 20 in the PM detection sensor 2 with the failure judgment threshold value S0 so as to detect whether the sensor output value S is less than the failure judgment threshold value S0 (whether S<S0).

If the comparison result in step S15 indicates positive ("YES" in step S15), i.e. indicates that the sensor output value S is less than the failure judgment threshold value S0 (S<S0), the operation flow progresses to step S16. In step S16, the failure judgment part 10C decides that the PM filter 101 is operating correctly.

On the other hand, when the comparison result in step S15 indicates negative ("NO" in step S15), i.e. indicates that the sensor output value S is not less than the failure judgment threshold value S0 (S≥S0), the operation flow progresses to step S17. In step S17, the failure detection part 10C decides that the failure has occurred in the PM filter 101, and the PM filter 101 does not correctly operate. The PM detection sensor control part 10 finishes the operation of the failure detection process shown in FIG. 6.

The PM detection sensor control part 10 turns on a warning light (not shown) so as to inform the occurrence of the PM filter failure to the driver of the own vehicle when the comparison result in step S15 indicates negative ("NO" in step S15), i.e. indicates that the sensor output value S is not less than the failure judgment threshold value S0 (S≥S0).

After this and prior to the execution of the next failure detection process, it is possible for the heating control part 10D to instruct the external voltage supply part 24 or another voltage power supply part to supply electric power to the heater part 3. When receiving the electric power, the heater part 3 generates heat energy, and the generated heat energy increases a temperature of the insulating substrate 23 so as to burn the particulate matter accumulated on the first surface of the insulating substrate 23. This heating process makes it possible to regenerate the PM detection sensor 2 having the sensor element 20 at the regeneration temperature. It is preferable to use the regeneration temperature of not less than 600° C., (for example, 700° C.).

It is acceptable to operate the heating control part 10D during the engine stop state or the idling stop control of the engine E to automatically stop the engine E operating. This suppresses the execution of the sensor regeneration of the PM detection sensor 2, and to extend the failure detectable period.

The repetition of the failure detection process shown in FIG. 6 allows the correct execution of the failure detection on the basis of the sensor output value S of the sensor element 20 in the PM detection sensor 2 only during a predetermined high load operation of the engine E having a large amount of particulate matter contained in exhaust gas emitted from the engine E. This makes it possible to increase the failure detection accuracy of the PM filter 101.

Figure 9:
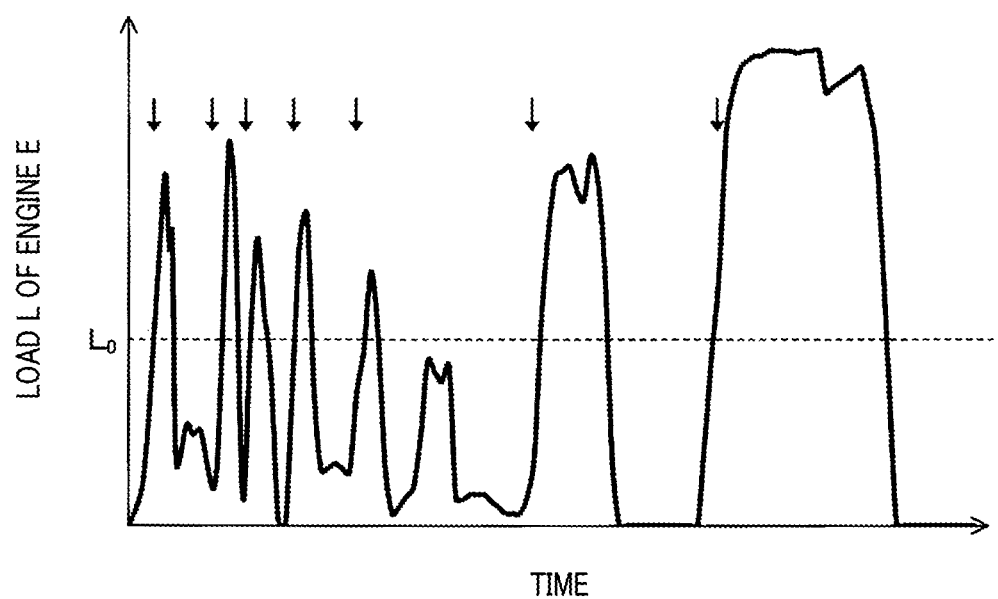
FIG. 9 is a timing chart showing one example of a time variation of the engine load, which is used by the failure detection device according to the first exemplary embodiment of the present invention.

FIG. 9 is a timing chart showing one example of a time variation of the load L of the engine E, which is used by the failure detection device 1 according to the first exemplary embodiment of the present invention. As shown in FIG. 9, in the operation state of the engine E having a large variation of the load L of the engine E and a large variation of the flow of exhaust gas, the failure detection timing, in which the load L of the engine E is not less than the judgment execution threshold value L0, often occurs. The failure detection timing previously described is designated by using the arrows shown in FIG. 9.

Because the failure detection process according to the first exemplary embodiment allows the PM detection sensor control part 10 to securely and correctly receive the sensor output value S of the sensor element 20 at the failure detection timings which correspond to the magnitude of the load L of the engine E, this makes it possible to increase the failure detection success rate.

On the other hand, because the conventional failure detection process performs the failure detection at constant time intervals, the probability that the failure detection is not performed at a correct timing is high. Accordingly, it becomes difficult to quickly detect occurrence of failure of the PM filter 101 when the failure detection process is performed when a less amount of particulate matter is contained in exhaust gas and the PM detection sensor 2 is regenerated during a high load operation of the engine E.

FIRST EXAMPLE AND COMPARATIVE EXAMPLE

Figure 10A:
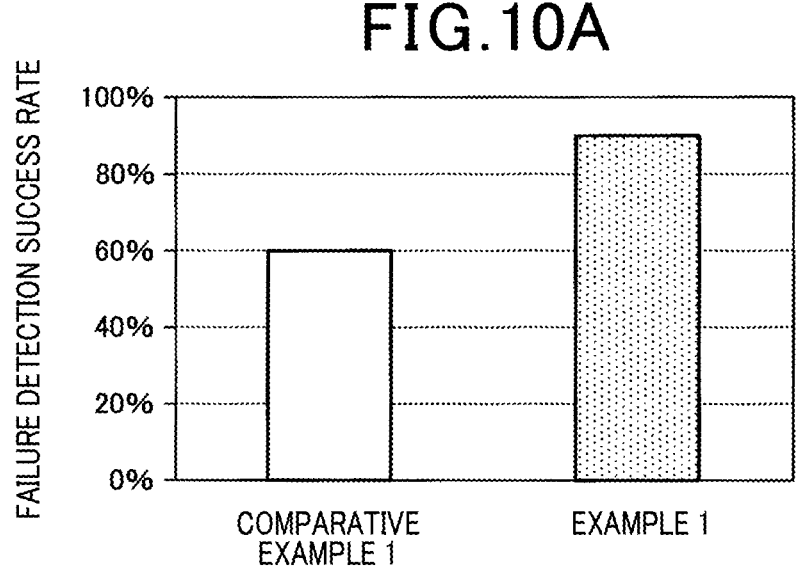
FIG. 10A is a graph showing a failure detection success rate of an example 1 detected by the failure detection device 1 according to the first exemplary embodiment of the present invention, and a failure detection success rate of a comparative example 1 detected by a conventional failure detection device.
Figure 10B:
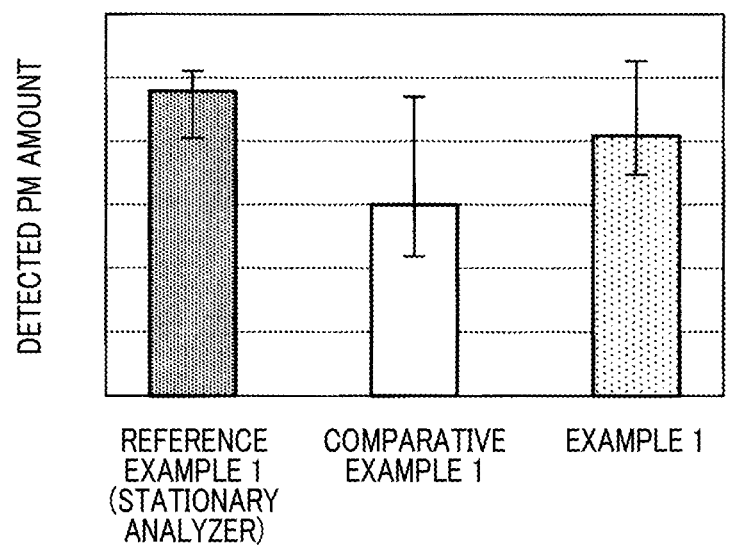
FIG. 10B is graph showing a detected amount of particulate matter of each of a reference example 1, comparative example 1 and example 1.

FIG. 10A is a graph showing the failure detection success rate of example 1 detected by the failure detection device 1 according to the first exemplary embodiment of the present invention, and the failure detection success rate of a comparative example 1 detected by a conventional failure detection device (not shown). FIG. 10B is graph showing the detected amount of particulate matter of each of reference example 1, comparative example 1 and example 1.

As shown in FIG. 10A and FIG. 10B, the failure detection success rate of example 1 which is significantly difference from the failure detection success rate of comparative example 1. That is, FIG. 10A shows the failure detection success rate of example 1 and the failure detection success rate of comparative example 1 when a failed PM filter 101 is mounted on the exhaust gas pipe EX and the engine E is driven twenty times at a predetermined driving mode. In the case of comparative example 1 shown in FIG. 10A, the failure detection process is performed under the operation condition in which the same PM detection sensor 2 is used, and the PM filter 101 is mounted on the exhaust gas pipe EX and the failure detection process is periodically performed during the overall driving mode and the regeneration of the PM detection sensor 2 is performed so as for the PM detection sensor 2 to intermittently transmit the sensor signal as the detection signal to the PM detection sensor control part 10.

FIG. 10B shows the detected amount of particulate matter contained in exhaust gas, which is calculated on the basis of the sensor signal as the output signal of the PM detection sensor 2 in example 1 and comparative example 1. Further, FIG. 10B shows reference example 1 having the amount of particulate matter contained in exhaust gas emitted from the engine E detected by using a stationary analyzer under the predetermined driving mode. In FIG. 10B, the error bar represents a detection variation of the amount of particulate matter in each of reference example 1, comparative example 1 and example 1.

As clearly shown in FIG. 10B, comparative example 1 has the variation (i.e. the vertical width of the error bar) of the detected amount of particulate matter which is significantly greater than that of reference example 1 and example 1. The failure detection success rate of comparative example 1 is approximately 60% of that of reference example 1.

The detected amount of particulate matter of example 1 is approximately equal to that of reference example 1, and has the reduced detection variation of the amount of particulate matter. That is, example 1 has the failure detection success rate of approximately 90%. This makes it possible for example 1 which corresponds to the failure detection device according to the first exemplary embodiment, to detect occurrence of failure of the PM filter 101 with high accuracy.

As previously described, the failure detection device 1 according to the first exemplary embodiment uses the sensor element 20 of an electrical resistance type as an accumulation type PM detection sensor. However, the concept of the present invention is not limited by this. For example, it is possible for the failure detection device 1 according to the first exemplary embodiment to use a PM detection sensor of non-electrical resistance type or a PM detection sensor of an accumulation type.

There is, as one of the PM detection sensors of the accumulation type, a sensor element of an electrostatic capacity type which detects the accumulation amount of particulate matter, and transmits a sensor signal which corresponds to the detected accumulation amount of particulate matter.

The PM detection sensor of a non-accumulation type continuously transmits detection signals, which correspond to the amount of particulate matter, to the PM detection sensor control part 10 without accumulating particulate matter on a surface of the sensor element. For example, there are, as the PM detection sensor of a non-accumulation type, capacitive type sensors (or current detection type sensors) such as an ionization induced charge sensor used in the patent document 2 previously described, a contact charge sensor, etc.

Figure 11:
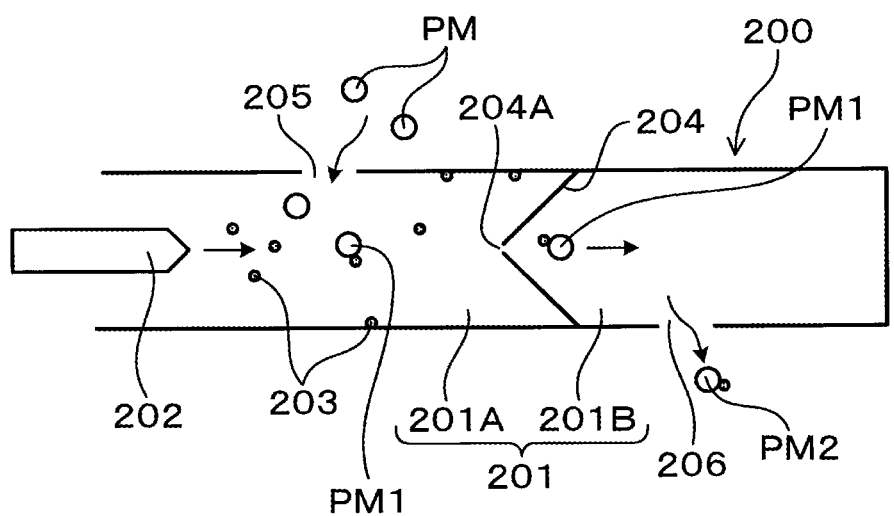
FIG. 11 is a view showing a schematic structure of a sensor part as a PM detection part in the PM detection sensor used in the failure detection device according to the first exemplary embodiment of the present invention.
Figure 12:
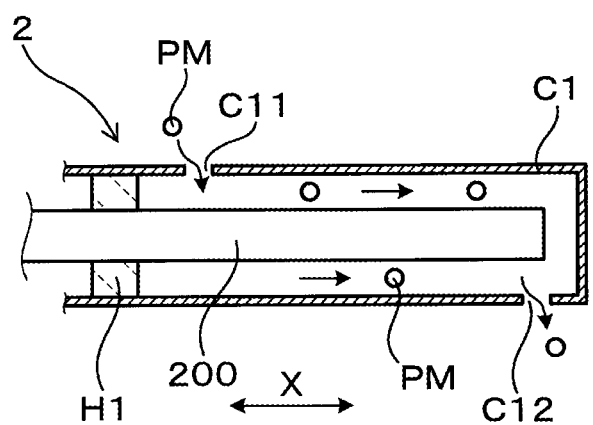
FIG. 12 is a view showing a cross section of another schematic structure of the PM detection sensor in the failure detection device according to the first exemplary embodiment of the present invention.

FIG. 11 is a view showing a schematic structure of the sensor part as the PM detection part in the PM detection sensor 2 used in the failure detection device 1 according to the first exemplary embodiment. FIG. 12 is a view showing a cross section of another schematic structure of the PM detection sensor 2 in the failure detection device 1 according to the first exemplary embodiment.

A description will now be given of a schematic structure of the PM detection sensor 2 equipped with a sensor part 200 of a capacitive type (or a current detection type) as the PM detection part with reference to FIG. 11 and FIG. 12, instead of using the sensor element 20 previously described. The sensor element 20 is used in the PM detection sensor 2 previously explained. Further, a description will now be given of a particulate matter detection principle of the sensor part 200 of a capacitive type with reference to FIG. 11 and FIG. 12.

The sensor part 200 is a capacitive type as a non-accumulation type to be used in the PM detection sensor 2. As shown in FIG. 11, the PM detection sensor 2 equipped with the PM detection sensor part 200 is an example of ionization induced charge sensors. The sensor part 200 has a PM charging part 201 and an ion discharging part 202. The PM charging part 201 charges particulate matter contained in exhaust gas as a target detection gas. The ion discharging part 202 discharges ions 203. As shown in FIG. 11, the ion discharging part 202 is coaxially arranged at a first end part, which is open, of a cylindrical tube of the PM detection sensor part 200. The PM charging part 201 is arranged at a second end part, which is closed, of the cylindrical tube of the PM detection sensor part 200. The ion discharging part 202 discharges ions 203 toward the PM charging part 201 arranged at the second end part side of the cylindrical tube of the PM detection sensor part 200. The inside chamber of the PM charging part 201 has a partition wall 204 with a slit 204a. The slit 204a is formed at the intermediate part of the partition wall 204. As shown in FIG. 11, the PM charging part 201 has a first chamber 201A and a second chamber 201B which are partitioned from each other by the slit 204a. The first chamber 201A is open and arranged at the first end part of the sensor part 200. The second chamber 201B is closed and arranged at the second end part of the sensor part 200.

PM introduction holes 205 are formed in the wall part of the first chamber 201A. PM discharge holes 206 are formed in the wall part of the second chamber 201B.

FIG. 12 shows the schematic structure of the PM detection sensor 2 used in the failure detection device 1 according to the first exemplary embodiment. As shown in FIG. 12, the sensor part 200 is supported by and accommodated in the inside of the exhaust gas side cover C1. The sensor part 200 in the exhaust gas side cover C1 of the PM detection sensor 2 is mounted to the wall of the exhaust gas tube EX (see FIG. 1). The exhaust gas side cover C1 has a cylindrical body having a hollow structure. One end part of the exhaust gas side cover C1 is closed. A longitudinal direction of the sensor part 200 is substantially equals to an axial direction X of the exhaust gas side cover C1, and the closed part of the sensor part 200 is connected to the closed part of the exhaust gas side cover C1.

The sensor part 200 is supported and fixed to the open part of the exhaust gas side cover C1 through a cylindrical insulating body H1. This structure allows the first end part of the sensor part 200 protected by the exhaust gas side cover C1 projects in the inside of the exhaust gas pipe EX to expose exhaust gas which flows in the exhaust gas pipe EX. As shown in FIG. 12, exhaust gas as a detection target is introduced into the inside of the PM detection sensor 2 and is discharged to the outside of the PM detection sensor 2 through the holes C12.

Particulate matter is introduced into the inside of the first chamber 201A of the sensor part 200 through the PM introduction holes 205. The introduced particulate matter is charged by the ions 203 emitted from the ion discharging part 202. The charged particulate matter is designated by reference characters PM1 shown in FIG. 11. The charged particulate matter PM1 passes through the slit 204a, and moves into the second chamber 201B. The charged particulate matter PM1 is discharged as a charged particle PM2 from the sensor part 200 through the PM discharge holes 206. In this case, because a large amount of a discharge current Id supplied to the ion discharging part 202 flows into the PM charging part 201 (i.e. a receiving current Ir), and a remaining discharge current Id is discharged as the charged particle PM2. This generates a current loss $I_{loss}$ (i.e. Id=Ir+$I_{loss}$). Because the amount of this current loss $I_{loss}$ is in proportional to the amount of the charged particle PM2, when the failure detection device 1 detects this current loss $I_{loss}$, it is possible to correctly detect the amount of particulate matter contained in exhaust gas flowing in the exhaust gas pipe EX on the basis of the detected current loss $I_{loss}$.

The sensor part 200 of a capacitive type (or of an electrical current type) used in the PM detection sensor 2 successively transmits the sensor signals as the detection signals to the PM detection control part 10 (see FIG. 1). That is, the PM detection control part 10 receives the sensor signals in real time. Because the sensor part 200 of a capacitive type does not have an insensitive period, it is possible for the sensor part 200 to detect an amount of particulate matter contained in exhaust gas for a long period of time. On the other hand, the sensor element 20 has the insensitive period (see FIG. 5).

When integrating the sensor output values corresponding to the received sensor signals, the PM detection control part 10 correctly detects the amount of particulate matter contained in exhaust gas which has been discharged from the engine E into the exhaust gas pipe EX during the predetermined period of time. Accordingly, as previously described, it is possible for the failure detection device 1 having the PM detection sensor 2 equipped with the sensor part 200 to perform the failure detection process shown in FIG. 6, and to correctly detect the occurrence of failure of the PM filter 101 on the basis of the sensor output values obtained at the failure detection timing corresponding to the magnitude of the load L of the engine E.

Second Exemplary Embodiment

A description will be given of the failure detection process performed by the failure detection device 1 having the PM detection sensor 2 equipped with the sensor part 200 with reference to FIG. 13, FIG. 14A and FIG. 14B, and FIG. 15A and FIG. 15B.

The same components between the second exemplary embodiment and the first exemplary embodiment will be referred with the same reference numbers and characters. The explanation of the same components is omitted here for brevity.

As previously shown in FIG. 9, it is known that the actual amount of particulate matter contained in exhaust gas is easily different from the sensor output value S of the PM detection part such as the sensor element 20 in the PM detection sensor 2 when the amount of exhaust gas flowing in the exhaust gas pipe EX is not less than a predetermined amount under a condition in which the own vehicle is running under a large variation state of the engine load. In this case, there is a possible case in which the timing when the load L of the engine E becomes not less than the judgment execution threshold value L0 does not coincide with the timing when the failure detection of the PM filter 101 is performed. In particular, when the PM detection sensor 2 uses the sensor part 200 of a capacitive type, because the sensor part 200 of a capacitive type has a high temporal resolution and continuously transmits the sensor signals as the sensor output to the PM detection control part 10, an incorrect judgment often occurs due to a momentary change of a peak value of the sensor output caused by the variation of the load L of the engine E.

The failure detection device 1 according to the second exemplary embodiment performs the failure detection process only at the time when the load L of the engine E has been continued during a predetermine period of time when the PM detection sensor 2 uses the sensor part 200 of a capacitive type as the PM detection part. This makes it possible to increase the detection accuracy of the PM filter failure. Further, the failure detection device 1 according to the second exemplary embodiment calculates the integrated value of the sensor output values S of the sensor part 200 during the predetermined period of time, and performs the failure detection process based on the integrated value of the sensor output values S so as to prevent occurrence of the incorrect detection of the PM filter failure.

As previously shown in FIG. 1, the ECU 100 has the integrated value calculation part 10E in addition to the load detection part 10A capable of detecting the load L of the engine E. The integrated value calculation part 10E determines the detection period of the sensor part 200 as the PM detection part in the PM detection sensor 2 on the basis of the load L of the engine E detected by the load detection part 10A. Further, the failure judgment part 10E calculates an integrated value ΣS of the sensor output values S of the sensor part 200 during the detection period of the sensor part 200.

In this case, the judgment execution determination part 10B in the PM detection sensor control part 10 allows the failure judgment part 10C to perform the failure detection process of the PM filter 101 when the period T is not less than a predetermined threshold period T0, where the load L of the engine E is not less than the judgment execution threshold value L0 during the period T.

The integrated value calculation part 10E determines the detection period on the basis of the period T in which the load L of the engine E is not less than the judgment execution threshold value L0. For example, this detection period is equal to the period T. In addition, the failure judgment part 10C compares the integrated value ΣS with an integration threshold value ΣS0 as the failure judgment threshold value, and detects the occurrence of the PM filter failure on the basis of the comparison result.

Specifically, in the failure detection device 1 according to the second exemplary embodiment, the load detection part 10A in the ECU 100, the judgment execution determination part 10B in the PM detection sensor control part 10, the integrated value calculation part 10E in the ECU 100, and the failure judgment part 10C in the PM detection sensor control part 10 sequentially perform in order the load detection step, the integration value calculation step, the judgment execution determination step and the failure judgment step so as to detect the occurrence of failure of the PM filter 101.

That is, the judgment execution determination part 10B decides to perform the failure detection process of the PM filter 101 when the period T is not less than the predetermined threshold period T0, where the period T has been determined, in which the detected load L of the engine E is not less than the judgment execution threshold value L0.

The integrated value calculation part 10E in the ECU 100 determines the detection period of the sensor part 200 as the PM detection part on the basis of the load L detected by the load detection step. The failure judgment part 10C further performs the integration value calculation step of calculating the integrated value ΣS of the sensor output values S during the detection period of the sensor part 200. Specifically, the failure judgment part 10C determines the detection period of the sensor part 200 on the basis of the period T in which the load L obtained based on the integrated value ΣS of the sensor output values S is not less than the judgment execution threshold value L0. For example, it is possible to use the period T as the detection period of the sensor part 200.

The failure judgment part 10C compares the integrated value ΣS of the sensor output values S with the integration threshold value ΣS0 as the failure judgment threshold value, and judges whether the PM filter failure has occurred based on the comparison result.

A description will now be given of each of the load detection step, the judgment execution determination step, the integration value calculation step, and the failure judgment step with reference to FIG. 13.

Figure 13:
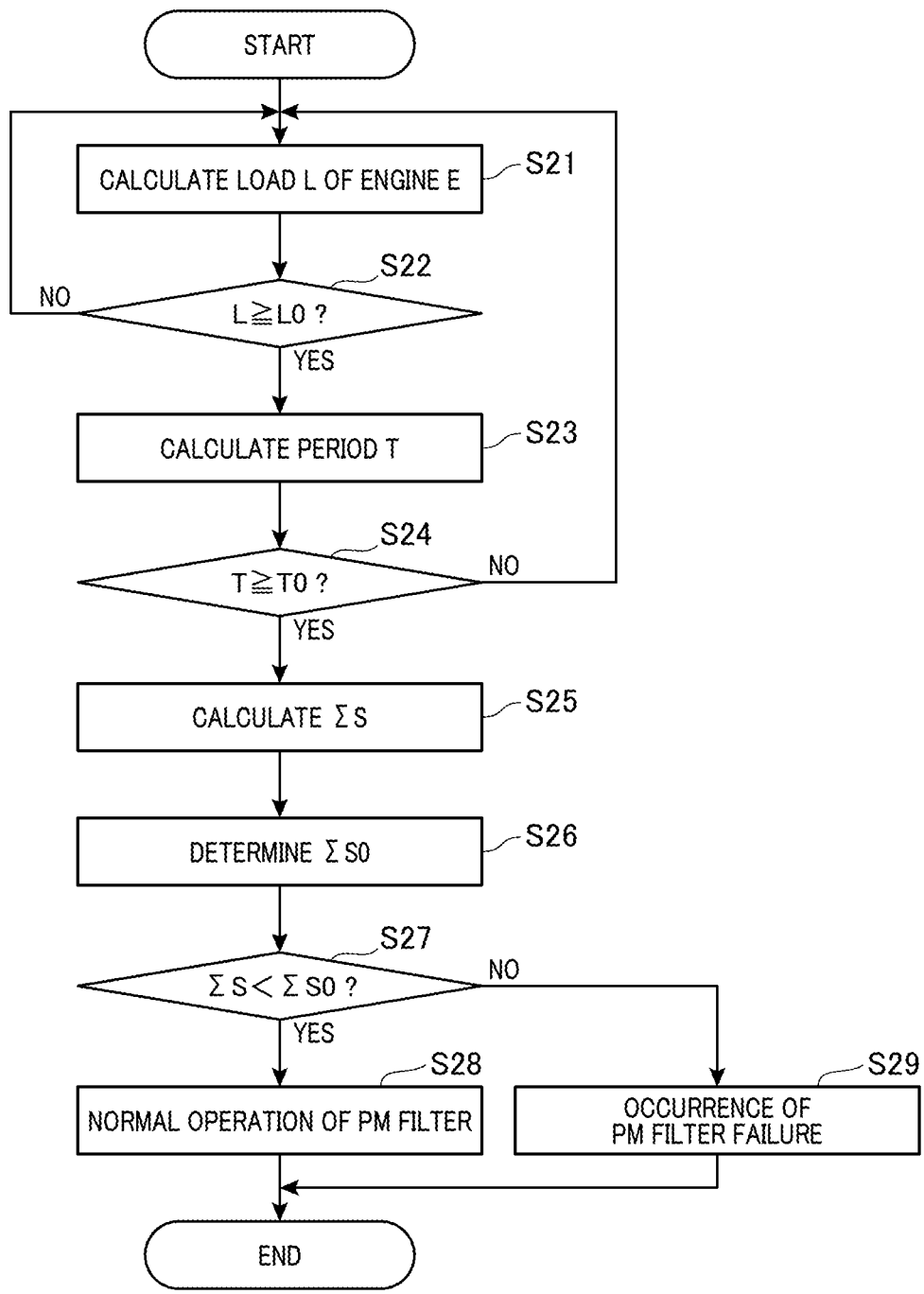
FIG. 13 is a view showing a flow chart of the failure detection process of the particulate matter filter performed by the failure detection device according to a second exemplary embodiment of the present invention.

FIG. 13 is a view showing a flow chart of the failure detection process of the PM filter 101 performed by the failure detection device 1 according to the second exemplary embodiment of the present invention. In FIG. 13, step S21 corresponds to the load detection step. A set of steps S22 to S24 corresponds to the judgment execution determination step. Step S25 corresponds to the integrated value calculation step. A set of steps S27 to S29 corresponds to the failure judgment step.

When the failure detection process is initiated, the load detection part 10A in the ECU 100 detects the load L of the engine E in step S21. The operation flow progresses to step S22. In step S22, whether the detected load L of the engine E is not less than the judgment execution threshold value L0 (i.e. when L≥L0).

Step S21 and step S22 in the second exemplary embodiment correspond to step S11 and step S12 in the first exemplary embodiment, respectively.

When the comparison result in step S21 indicates positive ("YES" in step S22), i.e. indicates that the detected load L of the engine E is not less than the judgment execution threshold value L0 (i.e. when L≥L0), the PM detection sensor control part 10 decides that the engine E is operating under a high load operation state suitable for the operation of the failure judgment.

When the comparison result in step S21 indicates negative ("NO" in step S22), i.e. indicates that the detected load L of the engine E is less than the judgment execution threshold value L0 (i.e. when L<L0), step S22 is repeatedly performed until the condition (i.e. when L≥L0) is satisfied.

It is possible for the PM detection sensor control part 10 to perform the failure detection process at an optimum timing when the load L of the engine E reaches the judgment execution threshold value L0. The operation flow progresses to step S23.

In step S23, the judgment execution determination part 10B calculates the period T in which the detected load L of the engine E is not less than the judgment execution threshold value L0 (i.e. when L L0). During the period T counted from the time when the load L of the engine E has reached the judgment execution threshold value L0, the load L of the engine E is maintained to be not less than the judgment execution threshold value L0. It is possible to detect the period T by using a timer in the PM detection sensor control part 10. The operation flow progresses to step S24.

In step S24, the judgment execution determination part 10B compares the period T with the predetermined threshold period T0 so as to judge whether the period T is not less than the predetermined threshold period T0 (whether T≥T0). It is possible to determine a value as the predetermined threshold period T0 so as to obtain a necessary detection accuracy of the PM detection part used in the PM detection sensor 2.

When the comparison result in step S24 indicates positive ("YES" in step S24), i.e. indicates that the period T is not less than the predetermined threshold period T0 (whether T≥T0), the judgment execution determination part 10B decides that the high load operation state of the engine E suitable for performing the failure detection has been continued during the predetermined period. The operation flow progresses to step S25.

In step S25, the judgment execution determination part 10B calculates the integrated value ΣS of the sensor output values S during the period T in which the load L of the engine E is not less than the judgment execution threshold value L0.

On the other hand, when the comparison result in step S24 indicates negative ("NO" in step S24), i.e. indicates that the period T is less than the predetermined threshold period T0 (whether T<T0), the calculated data items previously described are deleted, and the operation flow returns to step S21.

The load detection part 10A and the judgment execution determination part 10B repeatedly perform the set of step S21 to step S23 until the comparison result in step S24 indicates positive ("YES" in step S24), i.e. indicates that the period T is not less than the predetermined threshold period T0 (whether T≥T0).

As previously described, because the failure detection device 1 according to the second exemplary embodiment does not perform the failure detection process until the period T becomes not less than the predetermined threshold period T0 (whether T≥T0), it is possible for the failure detection device 1 to certainly perform the failure detection process at the correct failure detection timing with high accuracy.

Figure 14A:
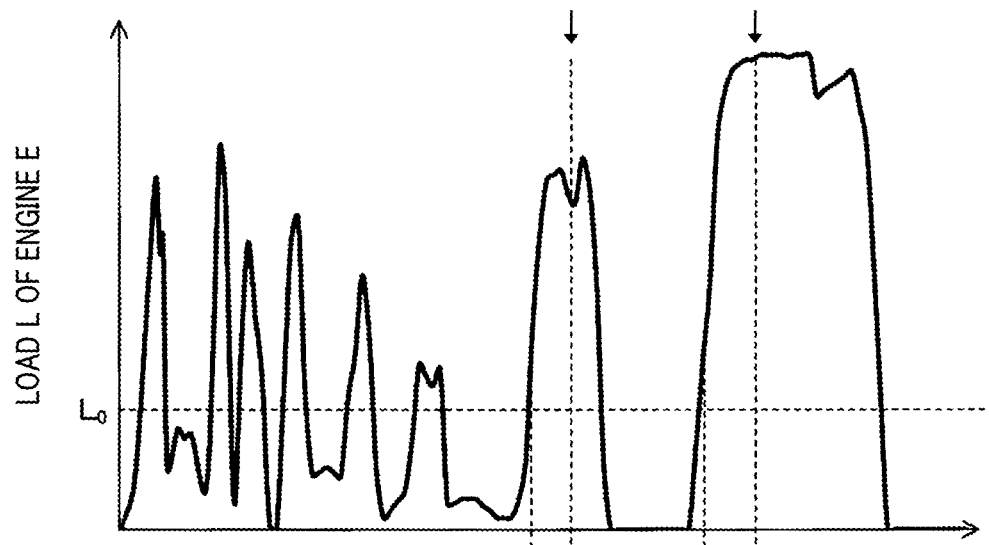
FIG. 14A and FIG. 14B are timing charts showing one example of the engine load and integrated values of sensor output values of the PM detection sensor varied in time obtained by the failure detection device according to the second exemplary embodiment.
Figure 14B:
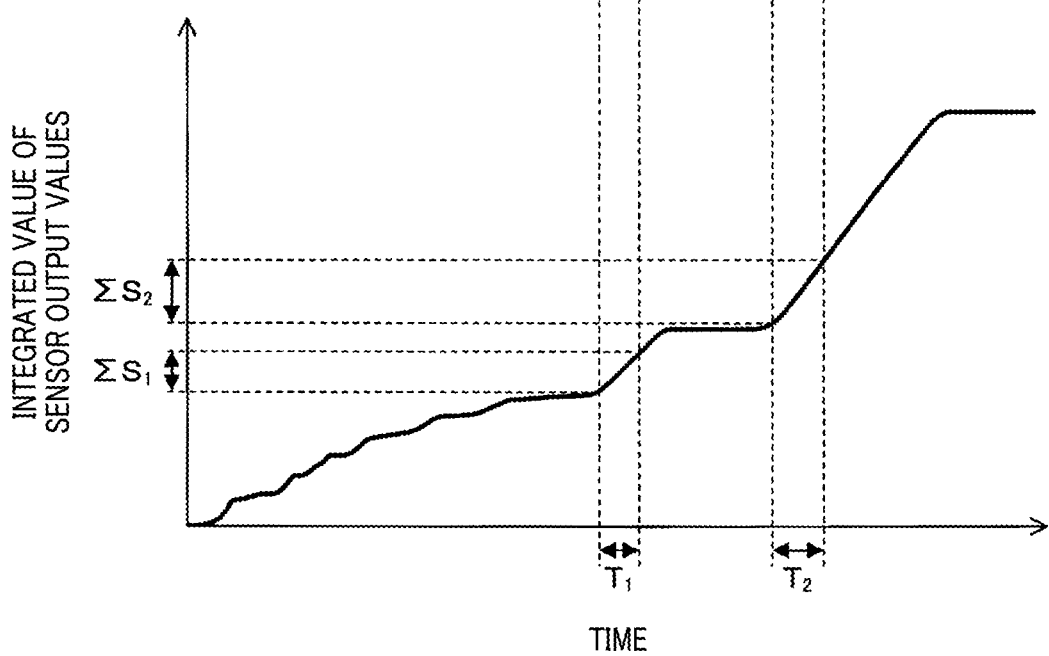

FIG. 14A and FIG. 14B are timing charts showing one example of the engine load L and the integrated values of the sensor output values S of the PM detection sensor 2 varied in time obtained by the failure detection device 1 according to the second exemplary embodiment. Similar to the case shown in FIG. 9, even if the load L of the engine E is significantly varied and the flow of exhaust gas is significantly varied shown in FIG. 14A and FIG. 14B, the comparison result in step S24 becomes negative ("NO" in step S24), i.e. indicates T<T0 because the period T does not exceed the predetermined threshold period T0 when the period T is a short period of time.

Further, when the load L of the engine E is not less than the judgment execution threshold value L0 (L≥L0) and the period T is not less than the predetermined threshold period T0 (whether T≥T0), the comparison result in step S24 becomes positive ("YES" in step S24), i.e. indicates T≥T0, for example, during the period T1 and the period T2 designated by the arrows shown in FIG. 14A and FIG. 14B.

Accordingly, in step S25, the judgment execution determination part 10B calculates the integrated value ΣS of the sensor output values S, for example, the integrated values ΣS1 and ΣS2 (which are designated by the arrows shown in FIG. 14B) of the sensor output values during the periods T1 and T2 shown in FIG. 14B, respectively.

In particular, the integrated value ΣS of the sensor output values S is represented by a difference between the sensor output value S at the start timing and the sensor output value at the finish timing during the period T (such as T1 and T2). It is possible for the judgment execution determination part 10B to integrate the sensor output values S transmitted from the sensor part 200 during the period counted from the start timing available to the finish timing thereof when the PM detection sensor 2 uses the sensor part 200 of a charge detection type.

The operation flow progresses to step S26. In step S26, the judgment execution determination part 10B determines the integration threshold value ΣS0 as the failure judgment threshold value. It is possible to correctly detect occurrence of the PM filter failure with high accuracy on the basis of the integration threshold value ΣS0. This integration threshold value ΣS0 is a predetermined threshold value which is higher than the integrated value ΣS of the sensor part 200 when the PM filter 101 is normally operating. That is, the use of the integration threshold value ΣS0 allows the failure judgment part 10C to correctly detect the occurrence of the PM filter failure.

The PM detection sensor control part 10 can determine the integration threshold value ΣS0 on the basis of experimental results in advance, like the failure judgment threshold value S0 which has been explained in the first exemplary embodiment.

Because the amount of particulate matter contained in exhaust gas, which flows in the exhaust gas pipe EX and reaches and detected by the OM detection sensor 2, varies due to the flow amount of exhaust gas, it is acceptable to adjust, i.e. increase the integration threshold value ΣS0 according to increase of the intake airflow amount, for example.

It is possible to store the judgment execution threshold value L0, the predetermined threshold period T0 and the integration threshold value ΣS0 in advance into the memory unit (not shown) of the PM detection sensor control part 10 or the ECU 100. It is also possible to calculate these values L0, T0 and ΣS0 every time on the basis of the operation state of the engine E and the detection signals transmitted from various types of the sensors to be transmitted to the ECU 100, previously described.

The operation flow progresses to step S27. In step S27, the failure judgment part 10C compares the integrated value ΣS of the sensor output values S with the integration threshold value ΣS0, and detects whether the integrated value ΣS of the sensor output values S is less than the integration threshold value ΣS0 (whether ΣS<ΣS0).

When the comparison result in step S27 is positive ("YES" in step S27, i.e. indicates that the integrated value ΣS of the sensor output values S is less than the integration threshold value ΣS0 (whether ΣS<ΣS0), the operation flow progresses to step S28.

In step S28, the failure judgment part 10C decides that the PM filter 101 is operating correctly. The PM detection sensor control part 10 finishes the failure detection process shown in FIG. 13.

On the other hand, when the comparison result in step S27 is negative ("NO" in step S27), i.e. indicates that the integrated value $\Sigma S$ of the sensor output values S is not less than the integration threshold value $\Sigma S0$ (whether $\Sigma S \geq \Sigma S0$), the operation flow progresses to step S29. In step S29, the failure judgment part 10C determines that the PM filter 101 is operating incorrectly, i.e. the PM filter failure has occurred. The PM detection sensor control part 10 finishes the failure detection process shown in FIG. 13.

EXAMPLE 2 AND COMPARATIVE EXAMPLE 2

Figure 15A:
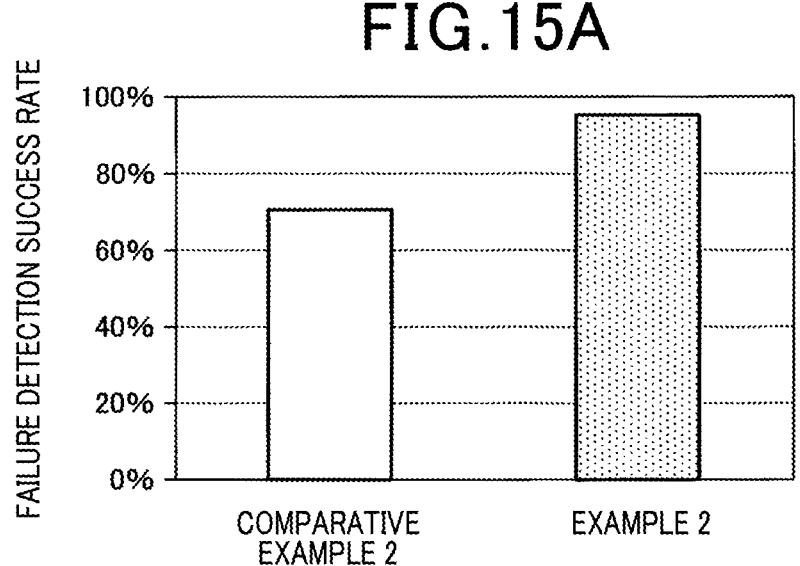
FIG. 15A is a graph showing a failure detection success rate of an example 2 detected by the failure detection device 1 according to the second exemplary embodiment of the present invention, and a failure detection success rate of a comparative example 2 detected by the conventional failure detection device.
Figure 15B:
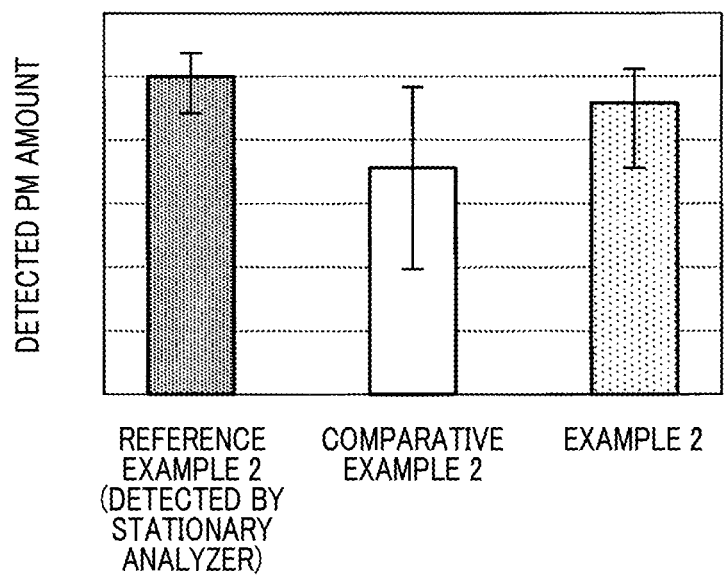
FIG. 15B is graph showing a detected amount of particulate matter of each of a reference example 2, comparative example 2 and example 2.

FIG. 15A is a graph showing the failure detection success rate of example 2 detected by the failure detection device 1 according to the second exemplary embodiment, and the failure detection success rate of comparative example 2 detected by the conventional failure detection device (not shown). FIG. 15B is graph showing a detected amount of particulate matter of each of a reference example 2, comparative example 2 and example 2. That is, FIG. 15A shows the failure detection success rate of example 2 and the failure detection success rate of comparative example 2 when a failed PM filter 101 is mounted on the exhaust gas pipe EX and the engine E is driven twenty times at a predetermined driving mode.

The PM detection sensor 2 used in the failure detection device 1 according to the second exemplary embodiment has the sensor part 200 instead of the sensor element 20 (which is used in the PM detection sensor used in the failure detection device 1 according to the first exemplary embodiment). The failure detection device 1 according to the second exemplary embodiment performs the failure detection process of detecting occurrence of the PM filter failure on the basis of the integrated value $\Sigma S$ of the sensor output values S during the predetermined detection period of the sensor part 200.

On the other hand, comparative example 2 also uses the PM detection sensor 2 used in the failure detection device 1 according to the second exemplary embodiment. In comparative example 2, the sensor part 200 continuously transmits the sensor output signals, and the PM detection sensor control part 10 and the ECU 100 perform the failure detection process. FIG. 15B shows the detected PM amount which has been calculated by using the same calculation process performed by the failure detection device a according to the first exemplary embodiment previously described.

Comparative example 2 has the detected PM amount shown in FIG. 15B which is larger than that of comparative example 1 shown in FIG. 10B. Further, as shown in FIG. 15B, comparative example 2 has a large variation of the detected PM amount, and the failure detection success rate thereof is approximately 70%.

On the other hand, example 2 has the detected PM amount which is approximately equal to that of reference example 2, and has a reduced variation of the detected PM amount shown in FIG. 15B.

Accordingly, it is possible for example 2 as the second exemplary embodiment to have the failure detection success rate of approximately 95% and to detect the PM filter failure with high accuracy.

Third Exemplary Embodiment

A description will be given of the failure detection device 1 according to the third exemplary embodiment with reference to FIG. 16 to FIG. 18.

FIG. 16 is a view showing a flow chart of the failure detection process of the PM filter 101 performed by the failure detection device 1 according to the third exemplary embodiment of the present invention. The same components between the third exemplary embodiment and the second exemplary embodiment will be referred with the same reference numbers and characters. The explanation of the same components is omitted here for brevity.

When the PM detection sensor control part 10 decides whether the failure detection process should be performed on the basis of the continuous period in which the engine E has the predetermined load L, there is a possible case in which it may be difficult to perform the failure detection process adequate number of times when a large variation of the load L of the engine E is continued, as shown in FIG. 9. In order to avoid this problem, the failure detection device 1 according to the third exemplary embodiment calculates a load average value $L_{ave}$ of the detected load L of the engine E, and compares the calculated load average value $L_{ave}$ with a predetermined load average value $L_{ave0}$. The failure detection device 1 according to the third exemplary embodiment performs the failure detection process when the comparison result indicates that the load average value $L_{ave}$ is greater than the predetermined load average value $L_{ave0}$.

This control operation makes it possible to maintain the number of times to perform the failure detection process regardless of the driving state of the engine E in the own vehicle.

Specifically, the failure detection device 1 according to the third exemplary embodiment has an integrated value calculation part 10E in addition to the load detection part 10A, similar to the structure of the failure detection device 1 according to the second exemplary embodiment.

The load detection part 10A detects the load L of the engine E and further calculates the load average value $L_{ave}$ of the detected load L of the engine E. For example, the load detection part 10A calculates the load average value $L_{ave}$ of the detected load L of the engine E during the predetermined period. At this time, the judgment execution determination part 10B in the PM detection sensor control part 10 decides to perform the failure detection process of the PM filter 101 when the load average value Lave of the detected load L of the engine E is not less than the predetermined load average value $L_{ave0}$.

The integrated value calculation part 10E determines the detection period of the particulate matter detection part such as the sensor element 20 in the PM detection sensor 2 on the basis of the load average value $L_{ave}$ of the load L of the engine E detected by the load detection part 10A in the PM detection sensor control part 10. The integrated value calculation part 10E calculates the integrated value $\Sigma S$ of the sensor output values S of the PM detection sensor 2 during the calculated detection period. The detection period is necessary to correctly calculate the load average value $L_{ave}$ of the detected load L of the engine E, for example.

The failure judgment part 10C compares the integrated value $\Sigma S$ of the sensor output values S with the integration threshold value $\Sigma S0$ as the failure judgment threshold value S0, and detects whether the PM filter 101 is in failure on the basis of the comparison result.

Specifically, in the failure detection device 1 according to the third exemplary embodiment, the load detection part 10A in the ECU 100, the judgment execution determination part 10B in the PM detection sensor control part 10, the integrated value calculation part 10E in the ECU 100, and the failure judgment part 10C in the PM detection sensor control part 10 sequentially perform in order the load detection step, the integration value calculation step, the judgment execution determination step and the failure judgment step so as to detect the occurrence of failure of the PM filter 101.

That is, during the load detection step, the load detection part 10A detects the load L of the engine E and calculates the load average value $L_{ave}$ of the detected load L of the engine E. During the judgment execution determination step, the judgment execution determination part 10B decides to perform the failure detection process of the PM filter 101 when the load average value Lave of the detected load L of the engine E is not less than the predetermined load average value $L_{ave0}$.

The integrated value calculation part 10E in the ECU 100 determines the detection period of the sensor part 200 as the PM detection part on the basis of the period in which the load average value $L_{ave}$ of the detected load L of the engine E has been calculated. Further, the integrated value calculation part 10E performs the integration value calculation step of calculating the integrated value ΣS of the sensor output values S during the detection period. This detection period is necessary to correctly calculate the load average value $L_{ave}$ of the detected load L of the engine E, for example.

The failure judgment part 10C compares the integrated value ΣS of the sensor output values S with the integration threshold value ΣS0 as the failure judgment threshold value S0, and detects whether the PM filter 101 is in failure on the basis of the comparison result.

A description will now be given of each of the load detection step, the judgment execution determination step, the integration value calculation step, and the failure judgment step with reference to FIG. 16. In the flow chart shown in FIG. 16, step S31 corresponds to the load detection step. Steps S32 corresponds to the judgment execution determination step. Step S34 corresponds to the integrated value calculation step. A set of steps S35 to S37 corresponds to the failure judgment step.

When the failure detection process is initiated, the load detection part 10A in the ECU 100 calculates the load average value Lave of the detected load L of the engine E in step S31. Specifically, similar to step S11 which has been explained in the first exemplary embodiment, the load detection part 10A detects the load L of the engine E during the predetermined detection period, and calculates the load average value $L_{ave}$ of the detected load L. The operation flow progresses to step S32.

In step S32, the judgment execution determination part 10B detects whether the calculated load average value $L_{ave}$ of the detected load L of the engine E is not less than the predetermined load average value $L_{ave0}$ (whether $L_{ave} \geq L_{ave0}$).

When the comparison result in step S32 indicates positive ("YES" in step S32), i.e. indicates that the calculated load average value $L_{ave}$ of the detected load L of the engine E is not less than the predetermined load average value $L_{ave0}$ (whether $L_{ave} \geq L_{ave0}$), the judgment execution determination part 10B determines that the engine E is operating in a high load state which is suitable for performing the failure detection step. When the judgment execution determination part 10B decides to perform the failure judgment step, the operation flow progresses to step S33.

On the other hand, when the comparison result in step S32 indicates negative ("NO" in step S32), i.e. indicates that the calculated load average value $L_{ave}$ of the detected load L of the engine E is less than the predetermined load average value $L_{ave0}$ (whether $L_{ave} < L_{ave0}$), the detection data items of the PM detection sensor 2 are deleted, and the operation flow returns to step S31. Step S31 is repeated until the comparison result in step S32 indicates positive ("YES" in step S32).

As previously described, the failure detection device 1 performs the failure detection process at a correct failure judgment execution timing when the load average value $L_{ave}$ of the detected load L reaches and/or exceeds the predetermined load average value $L_{ave0}$. The operation flow progresses to step S33.

In step S33, the judgment execution determination part 10B calculates the integrated value ΣS of the sensor output values S during the detection period. The operation flow progresses to step S44.

In step S44, the judgment execution determination part 10B determines the integration threshold value ΣS0 as the failure judgment threshold value S0. This integration threshold value ΣS0 is a predetermined threshold value which is higher than the integrated value ΣS of the sensor part 200 when the PM filter 101 is normally operating. That is, the use of the integration threshold value ΣS0 allows the failure judgment part 10C to correctly detect the occurrence of the PM filter failure. The PM detection sensor control part 10 can determine the integration threshold value ΣS0 on the basis of experimental results in advance, like the failure judgment threshold value S0 which has been explained in the first exemplary embodiment.

Because the amount of particulate matter contained in exhaust gas, which flows in the exhaust gas pipe EX and reaches and detected by the PM detection sensor 2, varies due to the flow amount of exhaust gas, it is acceptable to adjust, i.e. increase the integration threshold value ΣS0 according to increase of the intake airflow amount, for example.

It is possible to store the judgment execution threshold value L0, the predetermined threshold period T0 and the integration threshold value ΣS0 in advance into the memory unit (not shown) of the PM detection sensor control part 10 or the ECU 100. It is also possible to calculate these values L0, T0 and ΣS0 every time on the basis of the operation state of the engine E and the detection signals transmitted from various types of the sensors to be transmitted to the ECU 100, previously described. The operation flow progresses to step S35.

In step S35, the failure judgment part 10C compares the integrated value ΣS of the sensor output values S with the integration threshold value ΣS0, and detects whether the integrated value ΣS of the sensor output values S is less than the integration threshold value ΣS0 (whether ΣS<ΣS0).

When the comparison result in step S25 is positive ("YES" in step S35, i.e. indicates that the integrated value ΣS of the sensor output values S is less than the integration threshold value ΣS0 (whether ΣS<ΣS0), the operation flow progresses to step S36. In step S36, the failure judgment part 10C decides that the PM filter 101 is correctly operating. The PM detection sensor control part 10 finishes the failure detection process shown in FIG. 13.

On the other hand, when the comparison result in step S35 is negative ("NO" in step S35), i.e. indicates that the integrated value ΣS of the sensor output values S is not less than the integration threshold value ΣS0 (whether ΣS≥ΣS0), the operation flow progresses to step S37. In step S37, the failure judgment part 10C decides that the PM filter 101 is operating incorrectly, i.e. the PM filter failure has occurred. The PM detection sensor control part 10 finishes the failure detection process shown in FIG. 16.

Figure 17A:
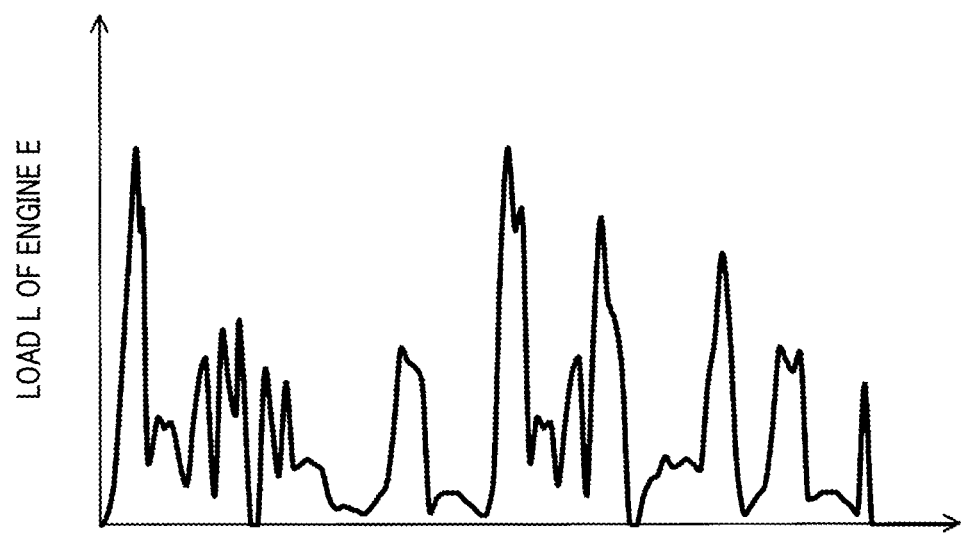
FIG. 17A and FIG. 17B are graphs showing one example of the variation of the engine load and an average value of a time variation of the engine load, which is used by the failure detection device according to the first exemplary embodiment of the present invention.
Figure 17B:
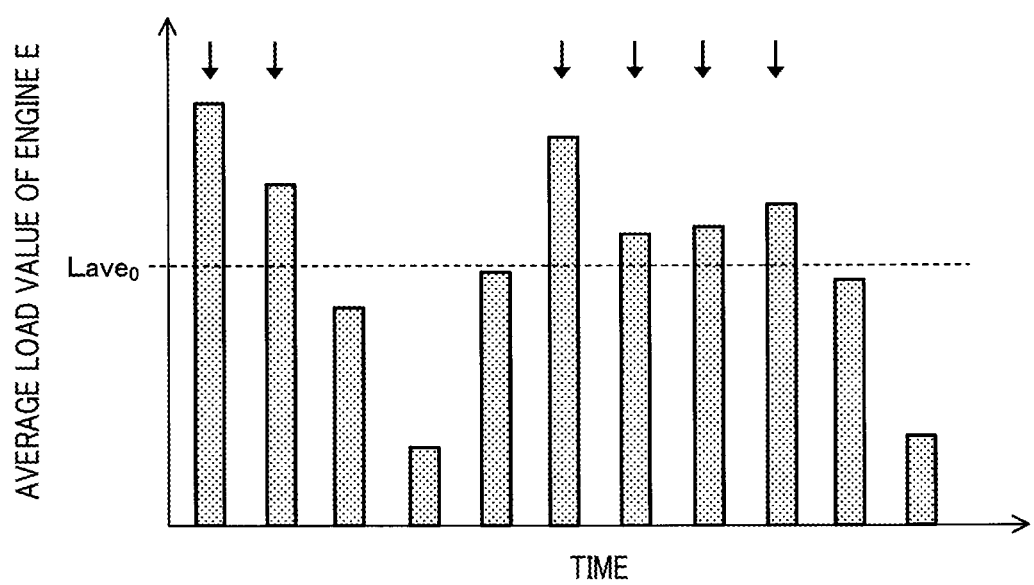

FIG. 17A and FIG. 17B are graphs showing one example of the variation of the engine load and an average value of a time variation of the engine load, which is used by the failure detection device according to the first exemplary embodiment of the present invention.

As shown in FIG. 17A and FIG. 17B, when the engine E is operating under a large variation state in which the load L of the engine E significantly varies and a flow amount of exhaust gas emitted from the engine E also significantly varies and the PM detection sensor 2 using a sensor part of a high temporal resolution continuously transmits the sensor output signals, a peak value of the sensor output signal instantaneously changes due to the variation of the load L of the engine E. In order to avoid this, when the failure detection process is performed when the period T, in which the load L is not less than the judgment execution threshold value L0, reaches the predetermined threshold period T0, like the case shown in the second exemplary embodiment previously described, it is often difficult to perform the failure detection process at a correct timing.

On the other hand, the failure detection device according to the third exemplary embodiment performs the failure detection process at timings (for example, which are designated by the arrows shown in FIG. 17B) when the calculated load average value $L_{ave}$ exceeds the predetermined load average value $L_{ave0}$.

It is possible for the failure detection device to perform the failure detection process of the PM filter 101 at correct timings with high accuracy and to suppress occurrence of incorrect detection of the PM filter failure due to the variation of the sensor output signals transmitted from the PM detection sensor 2.

EXAMPLE 3 AND COMPARATIVE EXAMPLE 3

Figure 18:
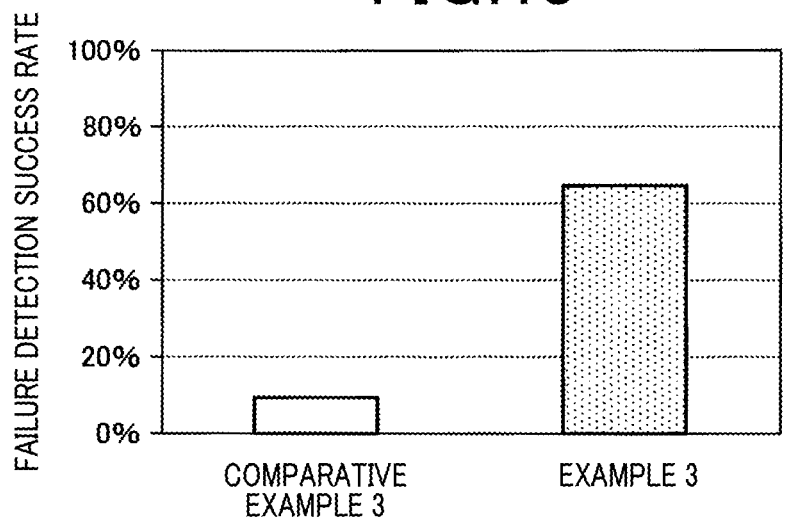
FIG. 18 is a graph showing a failure detection success rate of an example 3 detected by the failure detection device 1 according to the third exemplary embodiment of the present invention, and a failure detection success rate of a comparative example 3 detected by the conventional failure detection device.

FIG. 18 is a graph showing the failure detection success rate of example 3 detected by the failure detection device 1 according to the third exemplary embodiment and the failure detection success rate of comparative example 3 detected by the conventional failure detection device (Not shown). That is, FIG. 18 shows the failure detection success rate of example 3 and the failure detection success rate of comparative example 3 when the failed PM filter 101 is mounted on the exhaust gas pipe EX and the engine E is driven twenty times at a predetermined driving mode.

Example 3 uses the PM detection sensor 2 equipped with the sensor part 200, like the PM detection sensor 2 used in the second exemplary embodiment. Comparative example 3 uses the PM detection sensor 2 used in the third exemplary embodiment and performs the failure detection process similar to the case of comparative example 2.

As a result, the case of comparative example 3 has the failure detection success rate of approximately 10%. This means that the rate of the incorrect failure detection increases under a large variation of the load L of the engine E due to the increasing of the sensor output value.

Further, in a case in which the failure detection process is performed on the basis of the judgment execution threshold value L0 and the predetermined threshold period T0, like the case of example 2, when the period of time when the load L of the engine E significantly varies and the load L of the engine E exceeds the judgment execution threshold value L0 is reduced to a shorter period of time, no failure detection process is performed, and as a result, the timing available to perform the failure detection is limited.

On the other hand, the case of example 3 has the failure detection success rate of approximately 65% which is higher than that of comparative example 3 although the failure detection success rate of example 3 is lower than the failure detection success rate, approximately 90% of example 1 and the failure detection success rate, approximately 95% of example 2 previously described. This means that in example 3, the failure detection process is performed during a period having a large amount of particulate matter and a high load average value $L_{ave}$. That is, in the case of example 3, it is possible for the case of example 3 according to the third exemplary embodiment to increase the frequency of performing the failure detection, and to perform the failure detection process for the PM filter 101 with high accuracy even if the load of the engine E significantly varies.

The concept of the present invention is not limited by the first to third exemplary embodiment, the modifications thereof. In the first to third exemplary embodiments, the failure detection device 1 is applied to the internal combustion engine equipped with a turbocharger and an exhaust gas recirculation passage (EGR passage). For example, it is possible to apply the failure detection device according to the present invention to various structures having the internal combustion engine. It is further possible to apply the failure detection device according to the present invention to gasoline engines, gas engines, etc. in addition to diesel engines. Still further, it is possible to apply the failure detection device to various applications in addition to vehicles. It is possible to change a structure of each of the PM detection sensor and the sensor element in the failure detection device. For example, the PM detection sensor used in the first to third exemplary embodiments has an exhaust gas cover of a double container structure composed of an inner cover and an outer cover (see FIG. 3). For example, it is possible for the PM detection sensor to have an exhaust gas cover of a single container structure.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A failure detection device for detecting a failure of a particulate matter filter, the particulate matter filter being arranged on an exhaust gas pipe of an internal combustion engine, the failure detection device comprising:
 a particulate matter detection sensor comprising a particulate matter detection part configured to detect an amount of particulate matter contained in exhaust gas which has passed through the particulate matter filter, and to generate and transmit a sensor output signal which corresponds to the detected amount of particulate matter;
 a control system, including a processor and memory storing instructions which upon execution by the processor configure the control system such that the control system is at least configured to perform:
  a load detection that detects a load of the internal combustion engine;
  a judgment execution determination that performs a first comparison to compare the load of the internal combustion engine detected by the load detection with a judgment execution threshold value, and that determines whether to execute a failure determination of the particulate matter filter on a basis of a result of the first comparison, and that decides to execute the failure determination of the particulate matter filter when a period is not less than a predetermined threshold period, where in the period, the detected load of the internal combustion engine is maintained to be not less than the judgment execution threshold value;

a failure judgment that performs a second comparison to compare the sensor output signal of the particulate matter detection sensor with a failure judgment threshold value when the judgment execution determination decides that the failure determination of the particulate matter filter is to be executed, and the failure judgment also determines a presence or absence of a particulate matter filter failure on a basis of a result of the second comparison; and an integrated value calculation that determines a detection period of the particulate matter detection on a basis of the detected load of the internal combustion engine, and that calculates an integrated value of sensor output values of the particulate matter detection part during the detection period, and that determines the detection period of the particulate matter detection on a basis of the period in which the detected load of the internal combustion engine is maintained to be not less than the judgment execution threshold value, wherein the failure judgment also performs a third comparison to compare the calculated integrated value with an integration threshold value as the failure judgment threshold value, and decides an occurrence of the particulate matter filter failure on a basis of a result of the third comparison.

2. The failure detection device according to claim 1, wherein the judgment execution determination decides that it is necessary to execute the failure determination of the particulate matter filter upon determination that the detected load is not less than the judgment execution threshold value.

3. The failure detection device according to claim 1, wherein the particulate matter detection continuously generates and transmits sensor output signals which correspond to the amount of particulate matter contained in the exhaust gas.

4. A failure detection device for detecting a failure of a particulate matter filter, the particulate matter filter being arranged on an exhaust gas pipe of an internal combustion engine, the failure detection device comprising:

a particulate matter detection sensor comprising a particulate matter detection part configured to detect an amount of particulate matter contained in exhaust gas which has passed through the particulate matter filter, and to generate and transmit a sensor output signal which corresponds to the detected amount of particulate matter;

a control system, including a processor and memory storing instructions which upon execution by the processor configure the control system such that the control system is at least configured to perform:

a load detection that detects a load of the internal combustion engine, and that calculates a load average value of the detected load of the internal combustion engine;

a judgment execution determination that performs a first comparison to compare the load of the internal combustion engine detected by the load detection with a judgment execution threshold value, and that determines whether to execute a failure determination of the particulate matter filter on a basis of a result of the first comparison, and that decides to execute the failure determination of the particulate matter filter when the calculated load average value is not less than a predetermined load average value as the judgment execution threshold value;

a failure judgment that performs a second comparison to compare the sensor output signal of the particulate matter detection sensor with a failure judgment threshold value when the judgment execution determination decides that the failure determination of the particulate matter filter is to be executed, and the failure judgment also determines a presence or absence of a particulate matter filter failure on a basis of a result of the second comparison; and an integrated value calculation that determines a detection period of the particulate matter detection on a basis of the detected load of the internal combustion engine, and that calculates an integrated value of sensor output values of the particulate matter detection part during the detection period, and that determines the detection period of the particulate matter detection part on a basis of the period of the calculation of the load average value, wherein the failure judgment also performs a third comparison to compare the calculated integrated value with an integration threshold value as the failure judgment threshold value, and decides an occurrence of the particulate matter filter failure on a basis of a result of the third comparison.

5. The failure detection device according to claim 4, wherein the judgment execution determination decides that it is necessary to execute the failure determination of the particulate matter filter upon determination that the detected load is not less than the judgment execution threshold value.

6. The failure detection device according to claim 4, wherein the particulate matter detection continuously generates and transmits sensor output signals which correspond to the amount of particulate matter contained in the exhaust gas.

7. A failure detection method of detecting a failure in particulate matter filter, the particulate matter filter being mounted on an exhaust gas pipe of an internal combustion engine, the failure detection method comprising:

arranging a particulate matter detection sensor at a downstream side of the particulate matter filter, the particulate matter detection sensor comprising a particulate matter detection part configured to detect an amount of particulate matter contained in exhaust gas which has passed through the particulate matter filter, and generating and transmitting a sensor output signal which corresponds to the detected amount of particulate matter;

detecting a load of the internal combustion engine;

performing a first comparison to compare the load of the internal combustion engine with a judgment execution threshold value;

deciding whether a failure determination of the particulate matter filter is executed on a basis of a result of the first comparison;

performing a second comparison to compare the sensor output signal of the particulate matter detection sensor with a failure judgment threshold value when it has been decided that the failure determination of the particulate matter filter is to be executed when a period is not less than a predetermined threshold period, where the detected load of the internal combustion engine is maintained to be not less than the judgment execution threshold value during the period;

determining presence or absence of a particulate matter filter failure on a basis of a result of the second comparison;

determining a detection period of the particulate matter detection part on a basis of the detected load of the internal combustion engine;

calculating an integrated value of sensor output values of the particulate matter detection part during the detection period, the detection period of the particulate matter detection part being determined on a basis of the period in which the detected load of the internal combustion engine is maintained to be not less than the judgment execution threshold value; and performing a third comparison to compare the calculated integrated value with an integration threshold value as the failure judgment threshold value, and the occurrence of the particulate matter filter failure is determined on a basis of a result of the third comparison.

8. The failure detection method according to claim 7, wherein the failure determination of the particulate matter filter is executed when the detected load is not less than the judgment execution threshold value.

9. A failure detection method of detecting a failure in a particulate matter filter, the particulate matter filter being mounted on an exhaust gas pipe of an internal combustion engine, comprising:

arranging a particulate matter detection sensor at a downstream side of the particulate matter filter, the particulate matter detection sensor comprising a particulate matter detection part configured to detect an amount of particulate matter contained in exhaust gas which has passed through the particulate matter filter, and generating and transmitting a sensor output signal which corresponds to the detected amount of particulate matter;

detecting a load of the internal combustion engine;

calculating a load average value of the detected load of the internal combustion engine;

performing a first comparison to compare the load of the internal combustion engine with a judgment execution threshold value;

deciding whether a failure determination of the particulate matter filter is executed on a basis of a result of the first comparison;

performing a second comparison to compare the sensor output signal of the particulate matter detection sensor with a failure judgment threshold value when it has been decided that the failure determination of the particulate matter filter is executed when the calculated load average value is not less than a predetermined load average value as the judgment execution threshold value;

determining presence or absence of a particulate matter filter failure on a basis of a result of the second comparison;

determining a detection period of the particulate matter detection part on a basis of the detected load of the internal combustion engine;

calculating an integrated value of sensor output values of the particulate matter detection part during the detection period, the detection period of the particulate matter detection part being determined on a basis of the period of the calculation of the load average value; and performing a third comparison to compare the calculated integrated value with an integration threshold value as the failure judgment threshold value, and the occurrence of the particulate matter filter failure is determined on a basis of a result of the third comparison.

10. The failure detection method according to claim 9, wherein the failure determination of the particulate matter filter is executed when the detected load is not less than the judgment execution threshold value.

* * * * *